(12) United States Patent
Thackeray et al.

(10) Patent No.: US 8,313,721 B2
(45) Date of Patent: *Nov. 20, 2012

(54) LITHIUM-OXYGEN (AIR) ELECTROCHEMICAL CELLS AND BATTERIES

(75) Inventors: Michael M. Thackeray, Naperville, IL (US); Christopher S. Johnson, Naperville, IL (US); Sun-Ho Kang, Naperville, IL (US); Lynn Trahey, Clarendon Hills, IL (US); John T. Vaughey, Elmhurst, IL (US)

(73) Assignee: UChicago Argonne, LLC, Chicago, IL (US)

( * ) Notice: Subject to any disclaimer, the term of this patent is extended or adjusted under 35 U.S.C. 154(b) by 405 days.

This patent is subject to a terminal disclaimer.

(21) Appl. No.: 12/731,615

(22) Filed: Mar. 25, 2010

(65) Prior Publication Data

US 2010/0227220 A1    Sep. 9, 2010

Related U.S. Application Data

(63) Continuation-in-part of application No. 12/284,201, filed on Sep. 19, 2008.

(60) Provisional application No. 61/271,855, filed on Jul. 27, 2009, provisional application No. 61/166,293, filed on Apr. 3, 2009, provisional application No. 60/994,874, filed on Sep. 21, 2007.

(51) Int. Cl.
*C01B 31/36* (2006.01)

(52) U.S. Cl. ........................ 423/345; 502/413

(58) Field of Classification Search .................. 423/335, 423/345; 502/413
See application file for complete search history.

(56) References Cited

U.S. PATENT DOCUMENTS 7,303,840 B2    12/2007    Thackeray et al.

OTHER PUBLICATIONS

T. Ogasawara et al., Rechargeable Li2O2 Electrode for Lithium Batteries, J. Am. Chem. Soc. 128, 1390-1393 (2001).
C.S. Johnson et al., Li2O Removal from Li5FeO4: A Cathode Precursor for Lithium-Ion Batteries, Chem. Mater. 22, 1263-1270 (2010).
J. K. Ngala et al., Characterization and Electrocatalytic Behavior of Layered Li2MnO3 and Its Acid-Treated Form, Chem. Mater., 19, 229-234 (2007).
Y. Paik et al., Lithium and Deuterium NMR Studies of Acid-Leached Layered Lithium Manganese Oxides, Chem. Mater. 14, 5109-5115.
J.S. Kim et al., Electrochemical and Structural Properties . . . Chem. Mater. 16, 1996-2006, (2004).
C.S. Johnson et al., Structural and Electrochemical Analysis of Layered Compounds from Li2MnO3, Journal of Power Sources 81-82, 491-495 (1999).
P. Kalyani et al., Lithium Metal Rechargeable Cells Using Li2MnO3 as the Positive Electrode, Journal of Power Sources 80, 103-106 (1999).
N. Imanishi et al. Anti Fluorite Compounds Li5+xFe1−xCoxO4, as a Lithium Intercalation Host, Journal of Power Sources 146, 21-26, (2005).
A.R. Armstrong et al., Overcharging Manganese Oxides: Extracting Lithium Beyond Mn4+, Journal of Power Sources 146, 275-280, (2005).
J. Katana Ngala et al., Characterization and Electrocatalytic Behavior of Layered Li2MnO3 and Its Acid-Treated Form, Chem. Mater. 19, 229-234 (2007).
M.H. Rossouw et al., Synthesis and Structural Characterization of a Novel Layered Lithium Manganese Oxide, . . . Journal of Solid State Chemistry, 104, 464 (1993).
R. Luge et al., Ein neues Cobaltat mit Inselstruktur . . . Zeitschrift fur Anorganische and Allgemeine Chemie, 534, 61 (1986).

*Primary Examiner* — Edward Johnson
(74) *Attorney, Agent, or Firm* — Olson & Cepuritis, Ltd.

(57) ABSTRACT

This invention provides a lithium-oxygen or lithium-air electrochemical cell comprising a negative electrode, an electrolyte, and a porous activated positive electrode comprising lithium-rich electrocatalytic materials suitable for use in lithium-oxygen (air) cells and batteries. The activated positive electrode is produced by activating a precursor electrode formed from a material comprising one or more metal oxide compounds of general formula $xLi_2O \cdot yMO_z$, in which $0 < x \leq 4$, $0 < y \leq 1$, and $0 < z \leq 3$, in which M is typically, but not exclusively, a transition metal, excluding $Li_2MnO_3$ as a sole metal oxide compound in the precursor electrode. $Li_2O$ is extracted from the above-mentioned precursors to activate the electrode either by electrochemical methods or by chemical methods. The invention extends to batteries containing such electrochemical cells.

32 Claims, 12 Drawing Sheets

LITHIUM-OXYGEN (AIR) ELECTROCHEMICAL CELLS AND BATTERIES

CROSS-REFERENCE TO RELATED APPLICATIONS

This application claims the benefit of U.S. Provisional Application Ser. No. 61/166,293, filed on Apr. 3, 2009, and claims the benefit of U.S. Provisional Application Ser. No. 61/271,855, filed on Jul. 27, 2009, and is a continuation-in-part U.S. application Ser. No. 12/284,206, filed on Sep. 19, 2008, which in turn claims the benefit of U.S. Provisional Application Ser. No. 60/994,874, filed on Sep. 21, 2007; each of the foregoing applications being incorporated herein by reference in its entirety.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

This invention relates to electrocatalyst materials in positive electrodes (cathodes) for lithium-oxygen (or lithium-air) cells and batteries, notably rechargeable lithium-oxygen (air) cells and batteries. Lithium-oxygen (air) cells provide higher energy densities than conventional lithium-ion cells and have the potential for powering a wide range of applications, notably electric vehicles and hybrid-electric vehicles.

BACKGROUND OF THE INVENTION

Electrochemical energy conversion and storage in new, advanced battery systems will undoubtedly contribute to finding solutions to the world's energy problems and, in particular, to lessening its dependence on fossil fuels for transportation. Non-aqueous, lithium batteries offer the most flexible chemistries and the best promise for greater-than-incremental improvement over known battery systems, particularly in terms of their practical energy and power performance.

The most significant advantage of non-aqueous lithium batteries over aqueous systems is that they can operate at voltages significantly higher than the decomposition potential of water (about 1.2 V). Despite the progress that has been made in recent years with conventional lithium-ion cells, such as those that use lithiated graphite ($Li_xC_6$) or lithium titanate spinel $Li_4Ti_5O_{12}$ negative electrodes (anodes) in combination with lithium-metal-oxide or lithium-metal-phosphate positive electrodes (cathodes), for example, layered $LiCoO_2$, $LiNi_{0.8}CO_{0.15}Al_{0.05}O_2$ and $LiNi_{0.33}Mn_{0.33}Co_{0.33}O_2$, spinel $LiMn_2O_4$, olivine $LiFePO_4$ or compositional modifications thereof, the energy and power densities of rechargeable lithium-ion batteries, notably for applications such as electric vehicles and plug-in hybrid electric vehicles, are still limited by the specific and volumetric capacities of the electrode materials currently in use. New materials and cell designs are required to advance lithium battery technology. Lithium-oxygen (or lithium-air) cells offer the possibility of significantly increasing the energy density and performance of lithium-based electrochemical power systems. Because oxygen is supplied as a fuel to the cathode during discharge, a lithium-oxygen (air) cell can be considered to be a battery/fuel cell hybrid. However, the practical implementation of such cells is hampered, largely by the complexity and limitations of the oxygen (air) electrode. The present invention provides novel electrocatalyst materials for the positive electrode (cathode) for a future generation of lithium-oxygen (air) electrochemical cells and batteries. The invention also provides examples of such electrocatalyst/electrode materials and methods for synthesizing the electrocatalysts/electrodes.

SUMMARY OF THE INVENTION

This invention relates to materials that can be used as precursors for positive electrodes in lithium-oxygen (or lithium-air) cells and batteries, preferably non-aqueous rechargeable lithium-oxygen (air) cells and batteries, and to the positive electrodes formed therefrom. More specifically, the invention relates to lithium-oxygen or lithium-air electrochemical cells comprising porous activated positive electrodes formed from electrocatalyst precursor materials containing lithium cations, other metal cations, and charge balancing anions.

The present invention provides a lithium-oxygen or lithium-air electrochemical cell comprising a negative electrode, an electrolyte, and a porous activated positive electrode produced by activating a precursor electrode formed from a material comprising one or more metal oxide compounds of the general formula $xLi_2O \cdot yMO_z$, in which $0 < x \leq 4$, $0 < y \leq 1$, and $0 < z \leq 3$, in which M is typically, but not exclusively, a transition metal ion, excluding $Li_2MnO_3$ as a sole precursor metal oxide compound in the precursor electrode material, wherein the positive electrode is supplied with oxygen during discharge of the cell. The precursor electrode is activated by removing $Li_2O$ from at least one of the metal oxide compounds thereof (e.g., electrochemically, or by treatment with an acid). The precursor electrode material comprises a $Li_2O$ component in combination with one or more other components, preferably metal oxide components. The metal of the metal oxide component is selected preferably, but not exclusively, from one or more of the family of 1st, 2nd or 3rd row transition metals in the periodic table. Some examples of suitable precursor metal oxide compounds are $LiV_3O_8$ ($Li_2O \cdot 3V_2O_5$), $Li_3VO_4(3Li_2O \cdot V_2O_5)$, $Li_5FeO_4$ ($5Li_2O \cdot Fe_2O_3$), $LiFeO_2(Li_2O \cdot Fe_2O_3)$, $Li_6CoO_4$ ($3Li_2O \cdot CoO$), $Li_6NiO_4(3Li_2O \cdot NiO)$, $Li_6MnO_4$ ($3Li_2O \cdot MnO$), $Li_2MnO_3(Li_2O \cdot MnO_2)$, $Li_4Mn_5O_{12}$ ($2Li_2O \cdot 5MnO_2$), $Li_{0.3}MnO_{2.15}$ ($0.15Li_2O \cdot MnO_2$), $Li_2MoO_4$ ($4Li_2O \cdot MoO_3$), $Li_2RuO_3(Li_2O \cdot RuO_2)$, $Li_8PtO_6$ ($4Li_2O \cdot PtO_2$) and $Li_8IrO_6(4Li_2O \cdot IrO_2)$, provided that $Li_2MnO_3$ is only utilized in combination with another compound of general formula $xLi_2O \cdot yMO_z$. If desired, M can include Li in combination with another metal, as is the case for the stable compound $Li_{1.2}V_3O_8$ ($Li_2O \cdot 3Li_{0.133}V_2O_5$), in which the vanadium ions are partially reduced. This invention therefore includes $xLi_2O \cdot yMO_z$ precursor compounds in which M is partially substituted by Li. Precursor electrodes materials having an antiflourite- or a defect antifluorite structure, are particularly attractive because they have the same structure-type of the $Li_2O$ product of a lithium-oxygen (air) cell, when fully discharged. In $Li_2O$, the cation to anion ratio is equal to 2:1, whereas in defect antiflourite structures, the cation to anion ratio is less than 2:1.

The precursor electrodes of this invention may also be comprised of anion- or cation-substituted compositions to provide, for example, extra stability to the electrode structure or enhanced electrochemical activity, or both. For example, F⁻ ions may substitute partially for O in the oxygen array, or the metal cations in the precursor structure may be partially substituted by non-transition metal cations such as $Mg^{2+}$, $Al^{3+}$ and $Si^{4+}$ and $P^{5+}$. The precursor electrode materials may also comprise one or more components, for example, catalytic elements such as Co, Pt or the like or, alternatively, catalytic compounds, notably metal oxides such as $MnO_2$ and $V_2O_5$, to enhance the reactivity of the precursor materials to facilitate lithium extraction from the electrodes and the subsequently formed electrodes while charging and discharging the lithium-oxygen (air) cells. From this viewpoint, the electrode precursor materials of the invention may be construed as functioning not only as an electrode for accommodating and releasing lithium during discharge and charge, but also as an electrocatalyst for making and breaking lithium-oxygen bonds.

In general terms, therefore, lithium is extracted from the $Li_2O$-containing precursors during the charge process with the release of at least some oxygen from the precursor structure. This process may, in some instances, be accompanied by the oxidation of non-lithium metal ions in the cathode compartment. During the discharge process, lithium from the charged anode is reintroduced into the cathode compartment together with oxygen gas (either in pure form, or diluted form (e.g., diluted with an electrochemically inert gas), or as air) from an external source to regenerate the $Li_2O$ component in the structurally modified and activated cathode; the reaction at the cathode may also involve reduction of the non-lithium metal ions in the electrode compartment. Significant advantages of the materials of the present invention include (1) the cathode precursors can be inherently more stable than $Li_2O$ itself, and (2) electrochemical extraction of $Li_2O$ from the precursors may occur at potentials significantly lower than that required to dissociate $Li_2O$ alone into lithium and oxygen. The present invention encompasses methods for synthesizing the precursor lithium-metal-oxide electrodes, as well as lithium cells and batteries containing such precursor electrodes.

BRIEF DESCRIPTION OF THE DRAWINGS

The invention comprises certain novel features hereinafter fully described, and illustrated in the accompanying drawings, it being understood that various changes in the details may be made without departing from the spirit, or sacrificing any of the advantages of the present invention.

DETAILED DESCRIPTION OF PREFERRED EMBODIMENTS

Figure 1:
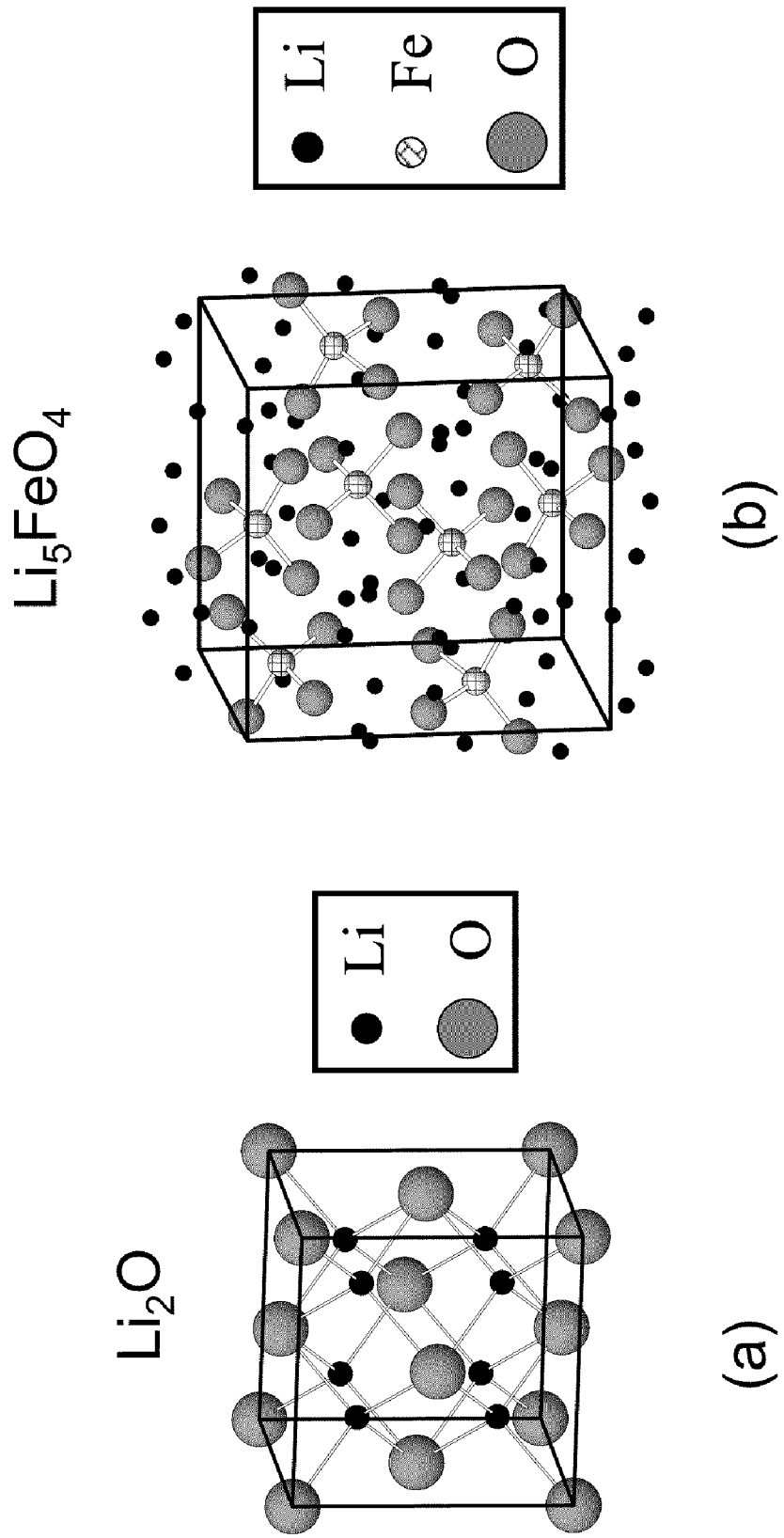
FIG. 1 provides a schematic illustration of (a) $Li_2O$ with an antifluorite-type structure and (b) $Li_5FeO_4$ with a defect antifluorite-type structure.

State-of-the-art $Li_xC_6/LiCoO_2$ lithium-ion batteries are limited by the theoretical specific capacity of the graphite anode (about 372 mAh/g) and $LiCoO_2$ cathode (about 280 mAh/g). In practice, the graphite anode provides approximately 300-350 mAh/g, while the $LiCoO_2$ cathode provides only approximately 130-140 mAh/g. By contrast, lithium metal or a metal anode that alloys with lithium, such as Sn, offers a significantly higher theoretical capacity than a graphite anode (about 3863 mAh/g for Li metal and 994 mAh/g for Sn). In addition, the relatively high density of metal alloys, typically $\rho > 4$ g/cm³, provides anodes with significantly higher volumetric capacity compared to graphite ($\rho = 2.2$ g/cm³).

Manganese and vanadium oxide cathodes, such as $MnO_2$, $V_2O_5$ and $LiV_3O_8$ ($Li_2O.3V_2O_5$), which can be used directly as cathodes in the charged state, offer theoretical capacities in the range of about 300-440 mAh/g, respectively, of which approximately 250-300 mAh/g has been realized in practice. In addition, manganese-based electrodes with integrated or blended composite structures, such as 'layered-layered' $xLi_2MnO_3.(1-x)LiMO_2$(e.g., M=Mn, Ni, Co) structures, as disclosed by Kim et al. in Chemistry of Materials, Volume 16, page 1996(2004), and 'layered-spinel' $xLi_2MnO_3.(1-x)LiMn_{2-y}M_yO_4$(e.g., M=Li, Ni, Co, Mg, Al) structures, as disclosed in U.S. Pat. No. 7,303,840, the entire disclosures of which are incorporated by reference, have been reported to yield capacities close to 250 mAh/g at relatively low current rates. In U.S. Pat. No. 7,303,840, the 'layered-spinel' components have a $Li_2O$-containing component ($Li_2MnO_3$) and a partially charged spinel component ($LiMn_{2-y}M_yO_4$). The reason why structurally-integrated 'layered-layered' and 'layered-spinel' electrodes containing a $Li_2MnO_3$ component can provide capacities close or equal to the theoretical limit (about 250 mAh/g) is that the $Li_2MnO_3$ component can be activated above about 4.4 V during the initial charge by removal of $Li_2O$, leaving behind an active $MnO_2$ component that can accommodate lithium to yield $LiMnO_2$ within the composite electrode during the subsequent discharge.

Although these highly complex 'layered-layered' and 'layered-spinel' electrodes provide their theoretical capacity (about 250-260 mAh/g) at relatively low rates, they provide the highest capacities of all commercially available lithium-ion battery cathodes, such as $LiCoO_2$ (about 140 mAh/g), $LiNi_{0.8}Co_{0.15}Al_{0.05}O_2$ (about 180 mAh/g), $LiNi_{0.33}Mn_{0.33}Co_{0.33}O_2$ (160-170 mAh/g), spinel $LiMn_2O_4$ (110-120 mAh/g) olivine $LiFePO_4$ (150-160 mAh/g) and compositional modifications thereof. In order to increase the available capacity and energy of lithium-ion cells and batteries, it is therefore clear that alternative systems must be discovered and engineered. Lithium-oxygen (or lithium-air) cells, are particularly attractive candidates, because in principle, as shown in Table 1, the theoretical capacity of a working $O_2$ electrode in a $Li/O_2$ cell based on the masses of the active Li and $O_2$ electrode materials only, when the cell is discharged to $Li_2O_2$ is 1169 mAh/g, which translates to a theoretical energy density of 3623 Wh/kg for an open-circuit voltage of 3.1 V. If the $Li/O_2$ cell is completely discharged to $Li_2O$, then the theoretical electrode capacity is 1795 mAh/g, which translates to a theoretical energy density of 5204 Wh/kg for an open-circuit voltage of 2.9 V. If the mass of oxygen is excluded from the calculation, then the theoretical specific energy for the combustion of lithium is 11,202 Wh/kg, which closely approximates the combustion of gasoline (octane, $C_8H_{18}$). By comparison, the theoretical specific energy of a conventional $C_6/LiCoO_2$ cell at an average 3.6 V is only 568 Wh/kg, taking the masses of both carbon and $LiCoO_2$ electrodes into consideration, and assuming the full extraction of lithium from $LiCoO_2$.

TABLE 1

Theoretical specific energies (Wh/kg) for $Li/O_2$ cell reactions

| System | Reaction | OCV (V) | Th. Spec. Energy (Wh/kg) |
| --- | --- | --- | --- |
| $Li/O_2$ | $2 Li + O_2 \rightarrow Li_2O_2$ | 3.1 | 3623 (incl. O) |
| | $4 Li + O_2 \rightarrow 2 Li_2O$ | 2.9 | 5204 (incl. O) |
| | $4 Li + O_2 \rightarrow 2 Li_2O$ | 2.9 | 11,202 (excl. O) |
| Lithium-ion | $Li_xC_6 + Li_{1-x}CoO_2 \rightarrow C_6 + LiCoO_2$ | 3.6 | 568 |
| Octane | $C_8H_{18} + 12.5 O_2 \rightarrow 8 CO_2 + H_2O$ | — | approx. 13,000 (ex. O) |

In practice, however, it has been found that reversibility of $Li/O_2$ cells is seriously impaired if the cells are discharged completely to $Li_2O$; significantly improved electrochemical and cycling behavior can be achieved if the discharge reaction is limited to partial reduction of the oxygen in the presence of an $MnO_2$ catalyst to form lithium peroxide, $Li_2O_2$ (or 'LiO') as demonstrated recently by Bruce et al. in the Journal of the American Chemical Society, Volume 128, page 1390(2006). However, this reaction can provide at best only about 50% of the $Li_2O$ capacity; furthermore, lithium peroxide is an unstable and highly reactive material, which places restrictions on the calendar life and cycle life of such $Li/Li_2O_2$ cells.

This invention addresses the above limitations of $Li/O_2$ (air) cells and batteries by using cathode precursors with stabilized $Li_2O$-containing components. In one embodiment of the invention, precursor electrocatalyst materials for positive electrodes containing lithium cations, other metal cations, and charge balancing anions are disclosed. Generally speaking, the precursor materials comprise a $Li_2O$ component in combination with one or more other components, preferably metal oxide components that optionally can also contain lithium or lithia ($Li_2O$) components. The precursor electrode materials can be crystalline, partially crystalline, or amorphous, and they can have cation-deficient or anion-deficient structures. When metal oxide components are used, the metal ions are selected preferably, but not exclusively, from one or more of the family of 1st, 2nd or 3rd row transition metals in the periodic table, such as V, Mn, Fe, Ni, Co, Mo, Ru, Pt and Ir. Examples of such precursor materials with various compositions and structure types, amongst many others, include $LiV_3O_8(Li_2O.3V_2O_5)$, $Li_3VO_4(3Li_2O.V_2O_5)$, $Li_5FeO_4$ ($5Li_2O.Fe_2O_3$), $LiFeO_2(Li_2O.Fe_2O_3)$, $Li_6CoO_4$ ($3Li_2O.CoO$), $Li_6NiO_4(3Li_2O.NiO)$, $Li_6MnO_4$ ($3Li_2O.MnO$), $Li_2MnO_3(Li_2O.MnO_2)$, $Li_4Mn_5O_{12}$ ($2Li_2O.5MnO_2$), $Li_{0.3}MnO_{2.15}$ ($0.15Li_2O.MnO_2$), $Li_2MoO_4$ ($4Li_2O.MoO_3$), $Li_2RuO_3(Li_2O.RuO_2)$, $Li_8PtO_6$ ($4Li_2O.PtO_2$) and $Li_8IrO_6(4Li_2O.IrO_2)$, excluding $Li_2MnO_3$ as a sole metal oxide precursor compound. The compounds of this invention can, therefore, be defined in general as having a composition that falls within the range $xLi_2O.yMO_z$, in which $0<x\leq4$, $0<y\leq1$, and $0<z\leq3$, in which M is typically, but not exclusively, a transition metal ion. For example, M can also be one or more main group metals, such as Sn, that forms the compound $Li_2SnO_3$ ($Li_2O.SnO_2$), or M can be combinations of various metal or metalloid types. As stated hereinbefore, it is possible that the M can include Li, as is the case for the stable compound $Li_{1.2}V_3O_8(Li_2O.3Li_{0.133}V_2O_5)$, in which the vanadium ions are partially reduced. This invention therefore includes $xLi_2O.yMO_z$ compounds in which M is partially substituted by Li. In a second embodiment of the invention, the compounds can be preconditioned, for example, by acid treatment either to tailor the $Li_2O$ content in the precursor electrodes or to effect partial proton exchange for lithium, or both.

In a third embodiment of the invention, the precursor electrode materials can be comprised of one or more antiflourite- or defect antifluorite structures, which are particularly attractive because they have the same structure-type of the $Li_2O$ product of a fully-discharged lithium-oxygen (air) cell. In $Li_2O$, the cation to anion ratio is less than 2:1, whereas in defect antiflourite structures, the cation to anion ratio is less than 2:1. For example, the defect $Li_5FeO_4$ structure has a cation to anion ratio of 6:4 and can be represented in antifluorite notation as $Li_{1.25}Fe_{0.25}Vac_{0.50}O$, where "Vac" represents a vacancy in the structure. Thus, the $Li_5FeO_4$ structure may be regarded as a defect, Fe-stabilized $Li_2O$ structure. Similarly, $Li_6MnO_4$, $Li_6CoO_4$ and $Li_6NiO_4$ represent defect, M-stabilized $Li_2O$ structures (M=Mn, Co, Ni) with a cation to anion ratio of 7:4, with antifluorite notations $Li_{1.50}Mn_{0.25}Vac_{0.25}O$, $Li_{1.50}Co_{0.25}Vac_{0.25}O$ and $Li_{1.50}Ni_{0.25}Vac_{0.25}O$, respectively. A schematic illustration of $Li_2O$ with its characteristic antifluorite structure, in which the oxygen ions reside at the face-centered cubic positions of the unit cell and the $Li^+$ ions in all the tetrahedral interstices, is shown in FIG. 1a. $Li_2O$ has cubic Fm-3 m symmetry and a lattice parameter, a=4.614 Å. A schematic illustration of $Li_5FeO_4$ is depicted in FIG. 1b. In this case, the crystal symmetry is orthorhombic, the unit cell having parameters a=9.218 Å; b=9.213 Å; and c=9.159 Å, reflecting almost cubic symmetry and a doubling of the $Li_2O$ unit cell parameter in each direction. The high lithium content and defect character of antifluorite structures is believed to provide fast lithium-ion diffusion in this class of materials, which is a highly desired property of lithium battery cathodes for Li—$O_2$(Li-air) batteries, in particular. The invention is likewise extended to include defect structures with anionic vacancies, for example in the oxygen array of the antifluorite-type structures or cation-deficient antifluorite-type structures.

Conversely, because $Li_2O$ is a product of the reaction between lithium and oxygen of a Li-air or Li—$O_2$ cell, the electrode precursor may be one or more compounds, typically, but not exclusively, one or more metal oxides selected preferably from the family of transition metal oxides that can form compounds when reacted with $Li_2O$, particularly those containing catalytic metal elements such as V, Mn, Fe, Co, Ni, for example, $Li_3VO_4$ ($3Li_2O\cdot V_2O_5$), $LiFeO_2$($Li_2O\cdot Fe_2O_3$), $Li_5FeO_4$($5Li_2O\cdot Fe_2O_3$), $Li_2MnO_3$($Li_2O\cdot MnO_2$) and $Li_{0.3}MnO_{2.15}$($0.15Li_2O\cdot MnO_2$), the latter compound being formed by reaction of $Li_2O$ with alpha-$MnO_2$ that has a hollandite-type structure, for example, by an $Li^+$—$H^+$ ion-exchange reaction between lithium and the hydrated form of alpha-$MnO_2$.

The electrode precursors of this invention may be comprised of anion- or cation-substituted compositions and structures that enhance, for example, the stability and/or electrochemical activity of the electrode structure. Such substitutions are well known in the art of lithium battery electrode materials; for example, $F^-$ ions may substitute partially for O in the oxygen array, or the metal cations in the precursor structure may be partially substituted by non-transition metal cations such as $Mg^{2+}$, $Al^{3+}$ and $Si^{4+}$ and $P^{5+}$. The electrode precursor materials may also comprise one or more metal catalysts, for example, one or more transition-metal- or precious-metal elements such as V, Fe, Mn, Co, Ni, Ru, Pt, Ir or the like or, alternatively, catalytic compounds, notably metal oxides such as $MnO_2$ and $V_2O_5$, to enhance the reactivity of the precursor electrode in order to facilitate (1) lithium extraction from the precursor electrode materials and the subsequently formed electrodes while charging the lithium-oxygen (air) cells, and (2) the reaction of lithium with the oxygen or air electrode during discharge of the cells. Furthermore, the electrode precursor materials of this invention may be comprised of primary and secondary particles of varying size and have an average particle size. The size of the secondary particles falls preferably within the range of 500 nm to 50 microns, whereas the primary particles preferably have nano-dimensions of 500 to 1000 nm (1 micron) or less, more preferably 200 nm or less, and most preferably 100 nm or less, preferably with as narrow a particle-size distribution as possible.

In general terms, therefore, lithium is extracted from the $Li_2O$-containing precursors during the charge process with the release of at least some oxygen from the precursor structure; this process may, in some instances, be accompanied by the oxidation of non-lithium metal ions in the cathode compartment. During the discharge process, lithium from the charged anode is reintroduced into the charged cathode compartment together with oxygen gas (either in pure form, or diluted form, or as air) from an external source to partially regenerate or completely regenerate the $Li_2O$ component in the structurally modified and activated cathode. Reduction of the transition metals in the cathode compartment may also occur during this process. Significant advantages of the invention include (1) the cathode precursors, such as $Li_{1.2}V_3O_8$($Li_2O\cdot 3Li_{0.133}V_2O_5$), $LiFeO_2$ ($Li_2O\cdot Fe_2O_3$), $Li_4Mn_5O_{12}$($2Li_2O\cdot 5MnO_2$) and $Li_{0.3}MnO_{2.15}$ ($0.15Li_2O\cdot MnO_2$), are inherently more stable than $Li_2O$ itself, and (2) electrochemical extraction of $Li_2O$ from the precursors may occur at potentials that are easily accessible, and significantly lower than that required to dissociate $Li_2O$ alone into lithium and oxygen.

The present invention encompasses methods for synthesizing and activating the precursor positive electrodes, as well as electrochemical lithium cells and batteries containing such precursor electrodes. In one embodiment, the activation method includes applying a sufficiently high potential to the precursor electrode material in an electrochemical cell to remove lithium and oxygen from the electrode during charge. During this process, the lithium from the precursor electrode is loaded into the negative electrode of the cell. During the subsequent discharge, oxygen or air, in either pure or diluted form, introduced into the activated cathode compartment, combines electrochemically with the lithium from the anode compartment.

In a further embodiment, the invention therefore includes a lithium-oxygen or lithium-air electrochemical cell comprising a negative electrode, an electrolyte, and a positive electrode; the positive electrode comprising the precursor material containing lithium cations, metal cations, and charge-balancing anions, wherein the precursor material comprises a $Li_2O$ component in combination with one or more other components. The negative electrode of the cell is comprised of one or more of a carbon material, a metal material, a semi-metal material, an intermetallic material, and/or a metal oxide material. In a preferred embodiment, the negative electrode is comprised of one or more of amorphous carbon, graphite, Li, Sn, Si, $Cu_6Sn_5$, and $Li_4Ti_5O_{12}$. The electrolyte of the cell comprises one or more electrolyte components, usually a solid electrolyte component in combination with a liquid electrolyte component, where the liquid electrolyte may be either aqueous or non-aqueous. The invention is extended to include lithium batteries comprising a plurality of electrochemical cells, either in series or in parallel, or both.

The principles of this invention are described with respect to the following electro catalyst materials and idealized reactions:

1. Composition of precursor electrocatalyst/electrode: $Li_2MnO_3$ in combination with another compound of formula $xLi_2O\cdot yMO_z$ Initial charge reaction at the electrode for the $Li_2MnO_3$ component:

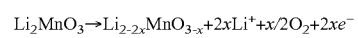

$$Li_2MnO_3 \rightarrow Li_{2-2x}MnO_{3-x} + 2xLi^+ + x/2O_2 + 2xe^-$$

Subsequent discharge reaction:

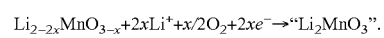

$$Li_{2-2x}MnO_{3-x} + 2xLi^+ + x/2O_2 + 2xe^- \rightarrow \text{``}Li_2MnO_3\text{''}.$$

The applicants believe that the electrochemical operation of a Li/$Li_2MnO_3$, $O_2$ cell can be described, at least in general terms, as follows: During the initial charge reaction, lithium and oxygen are extracted or partially extracted from the $Li_2MnO_3$ precursor electrode, i.e., from a charge balance standpoint, the net loss would be $xLi_2O$, where $0<x<1$. The extracted lithium can be deposited on lithium foil or carbon or incorporated within various anode substrate structures, such as graphite or other carbonaceous structures, metal, intermetallic, semi-metal or composite structures, such as those comprised of $C_6$, Al, Sn, $Cu_6Sn_5$, Si, and the like. During this charge process, oxygen is lost from the precursor electrode, either as a gas or by reaction with the surrounding electrolyte to yield an activated $Li_{2-2x}MnO_{3-x}$ electrode; some possible $H^+$—$Li^+$ exchange in proton-bearing electrolytes can also occur during this process. The extent to which the electrode is activated can be controlled by regulating the upper voltage limit of the cell. During the subsequent discharge, oxygen, in pure or diluted form, or as air, is introduced from an external source into the cathode compartment where it combines with, and is reduced by, the incoming lithium ions at approximately 3 V to yield an $Li_2O$-product that together with the residual activated $Li_{2-2x}MnO_{3-x}$ electrode yields a discharged product '$Li_2MnO_3$' that approximates or approaches the composition original $Li_2MnO_3$ precursor electrode. In the absence of a detailed and precise understanding of the electrochemical process, the applicants believe that, during the discharge reaction, it is likely that some of the manganese ions within the cathode compartment may also participate in the reduction process, for example, by lithium insertion into the activated $Li_{2-2x}MnO_{3-x}$ component, such as $MnO_2$ if x=1, thereby contributing to the capacity of the electrochemical cell.

By analogy, the same principle can be applied to cathode precursor materials that have defect antifluorite structures:

2. Composition of precursor electrocatalyst/electrode: $Li_5FeO_4$

Initial charge reaction at the electrode:

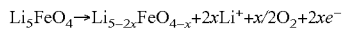

Subsequent discharge reaction:

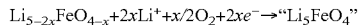

in which the "$Li_5FeO_4$" product of the discharge reaction need not have the same antifluorite structure of the parent precursor material.

In the $Li_5FeO_4$ cathode precursor, the Fe ions are, on average, trivalent. Because $Li_5FeO_4$ is a defect antifluorite structure with vacant tetrahedral sites, lithium can, in principle, be inserted into the structure, with the concomitant reduction of $Fe^{3+}$ to $Fe^{2+}$ to yield $Li_6FeO_4$. Therefore, this electrode system may allow for further capacity to be generated on discharge; on reaction with lithium from the anode and oxygen from an externally-supplied source, the activated (charged) $Li_{5-2x}FeO_{4-x}$ electrode in the cathode compartment would behave as other $Li_6MO_4$(M=Mn, Co, Ni) precursor electrodes as highlighted below.

3. Composition of precursor electrocatalyst/electrode: $Li_6MO_4$(M=Mn, Co, Ni)

Initial charge reaction at the electrode:

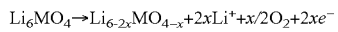

Subsequent discharge reaction:

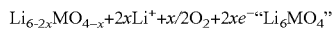

The above reactions can be extended to other $Li_2O$-containing precursor cathodes, such as $Li_2MoO_4(4Li_2O.MoO_3)$ $Li_2RuO_3(Li_2O.RuO_2)$, $Li_8PtO_6(4Li_2O.PtO_2)$ and $Li_8IrO_6$ $(4Li_2O.IrO_2)$ and the like, in accordance with the principles of this invention.

It has been previously established, for example, by Rossouw et al. in the Journal of Solid State Chemistry, Volume 104, page 464(1993), by Paik et al. in Chemistry of Materials, Volume 14, page 5109(2002) and by Armstrong et al. in the Journal of Power Sources, Volume 146, page 275(2005) that $Li_2O$ can be removed from $Li_2MnO_3$ ($Li_2O.MnO_2$) either electrochemically or chemically with acid, thereby making it possible to tailor the $Li_2O$ content in the residual $MnO_2$-based structure. $Li_2O$ extraction is accompanied by partial proton exchange for the lithium ions, particularly when $Li_2MnO_3$ is reacted with acid. More recently, Suib et al. in Chemistry of Materials, Volume 19, page 229(2007) have demonstrated that a precursor containing $Li_2MnO_3$ as the sole metal oxide component and a single, acid-treated, proton exchanged $Li_2MnO_3$ precursor, can act as an oxygen reduction electrocatalyst in a primary, non-aqueous Li-air cell. In their experiments, electrochemical capacities of 1040 and 1618 mAh/g (per gram of carbon used) were obtained for $Li_2MnO_3$—and proton-exchanged electrodes, respectively, which are significantly less than the capacities delivered by the $Li_2O$-containing electrode materials in the secondary (rechargeable) Li—$O_2$ cells described in this invention.

The overall principles of this invention are demonstrated by the following practical examples with $Li_5FeO_4$, substituted-$Li_5FeO_4$, $LiFeO_2$, a combination of $LiFeO_2$ and $Li_2MnO_3$, as well as an acid-treated combination of $LiFeO_2$ and $Li_2MnO_3$ as the precursor electrode materials.

Synthesis of Precursor Electrodes.

Figure 2:
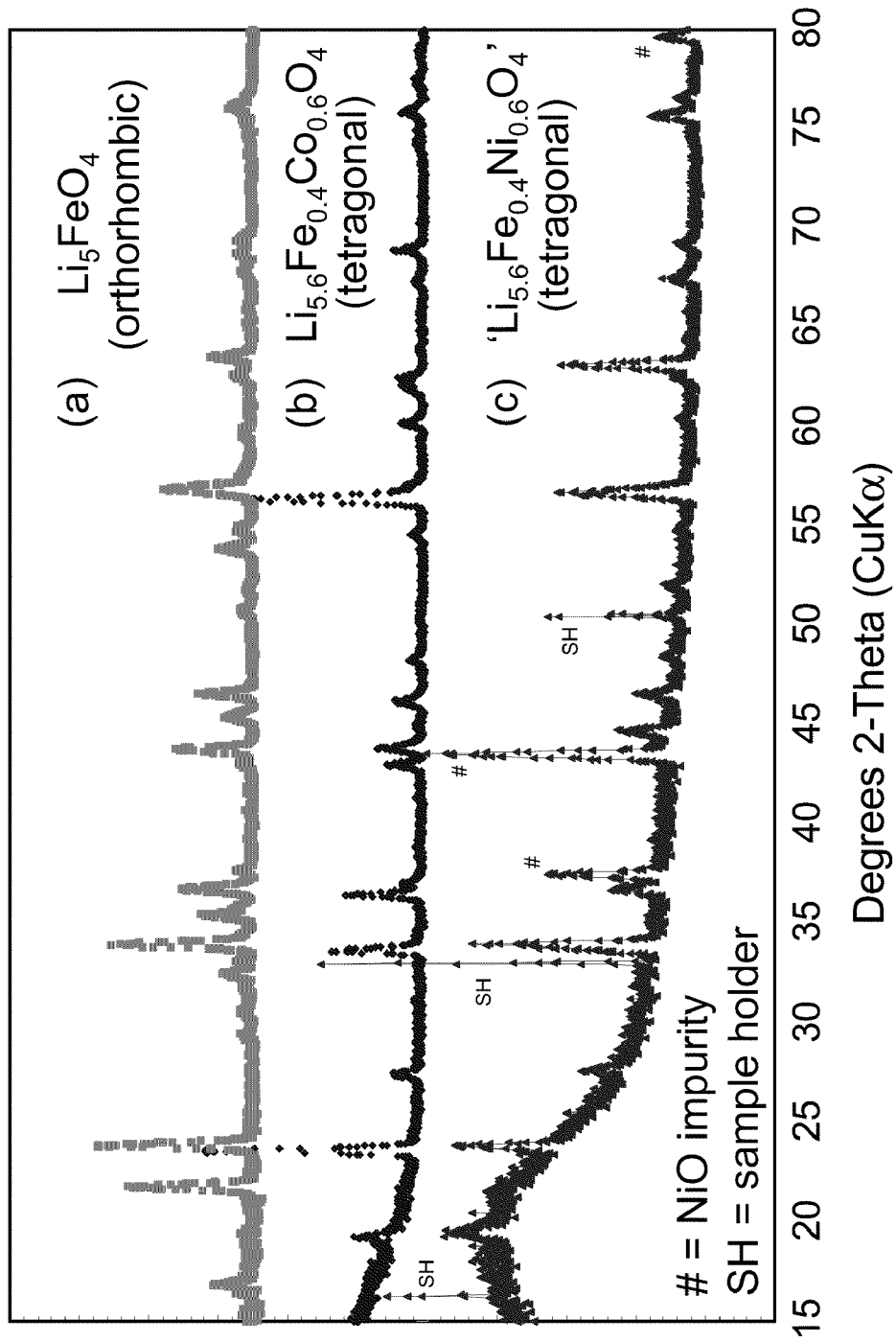
FIG. 2 provides illustrations of the powder X-ray diffraction pattern of (a) $Li_5FeO_4$, (b) $Li_{5.6}Fe_{0.4}Co_{0.6}O_4$, and (c) '$Li_{5.6}Fe_{0.4}Ni_{0.6}O_4$'.

$Li_5FeO_4$ was prepared by intimately mixing powders of lithium-hydroxide monohydrate, $LiOH.H_2O$ (Aldrich, 99+%) with nano-sized $Fe_2O_3$(Aldrich, 99+%) in the appropriate mole ratio, and firing the mixture under flowing nitrogen for 72 hours at 800° C. The X-ray diffraction pattern of a typical $Li_5FeO_4$ product, which showed the expected orthorhombic symmetry, is shown in FIG. 2a; the X-ray pattern revealed a small amount of $Li_2CO_3$ by-product, which was attributed to the reaction of the $Li_5FeO_4$ sample during exposure to dry air for about 8 hours prior to collecting the X-ray diffraction data, thereby indicating the relatively good stability of the material. Co- and Ni-substituted $Li_5FeO_4$ compounds with targeted compositions $Li_{5.6}Fe_{0.4}Co_{0.6}O_4$ and $Li_{5.6}Fe_{0.4}Ni_{0.60}O_4$ were prepared in the same manner as that described for $Li_5FeO_4$ using the appropriate amounts of cobalt carbonate ($CoCO_3$) and nickel carbonate hydroxide tetrahydrate ($2NiCO_3.3Ni(OH)_2.4H_2O$) precursor materials. The X-ray diffraction products of the two substituted products are shown in FIGS. 2b and 2c, respectively; in both instances, although similar to the pattern of $Li_5FeO_4$, the symmetry of the Co- and Ni-substituted compounds appeared to adopt tetragonal symmetry, as reported for $Li_6CoO_4$ by Hoppe et al. in Zeitschrift für anorganische and allgemeine Chemie, Volume 534, page 61(1986). $Li_2MnO_3$ was synthesized from lithium carbonate ($Li_2CO_3$) and manganese carbonate ($MnCO_3$) in air at 500° C. for 40 h. The X-ray diffraction pattern of this product (monoclinic symmetry) was consistent with patterns already reported in the literature for this product, for example, by Paik et al., in Chemistry of Materials, Volume 14, page 5109(2002).

Electrochemical Evaluation

Lithium coin cells (size 2032, Hohsen) were constructed using a lithium anode and a $Li_2MnO_3$ or $Li_5FeO_4$ cathode. The cathode compartment consisted of 80% $Li_2MnO_3$ or $Li_5FeO_4$ active material, 8% PVDF binder, and 6% graphite (SFG-6)/6% acetylene black as current collecting media. The electrolyte consisted of a 1.2 M $LiPF_6$ solution in ethylene carbonate: ethylmethyl carbonate (3:7 weight ratio; Tomiyama). The cells were charged to 4.8-5.0 V; the $Li_2MnO_3$ cells were discharged to 2.0 V, whereas the $Li_5FeO_4$ cells were discharged to 0.8 V.

Example 1

Figure 3:
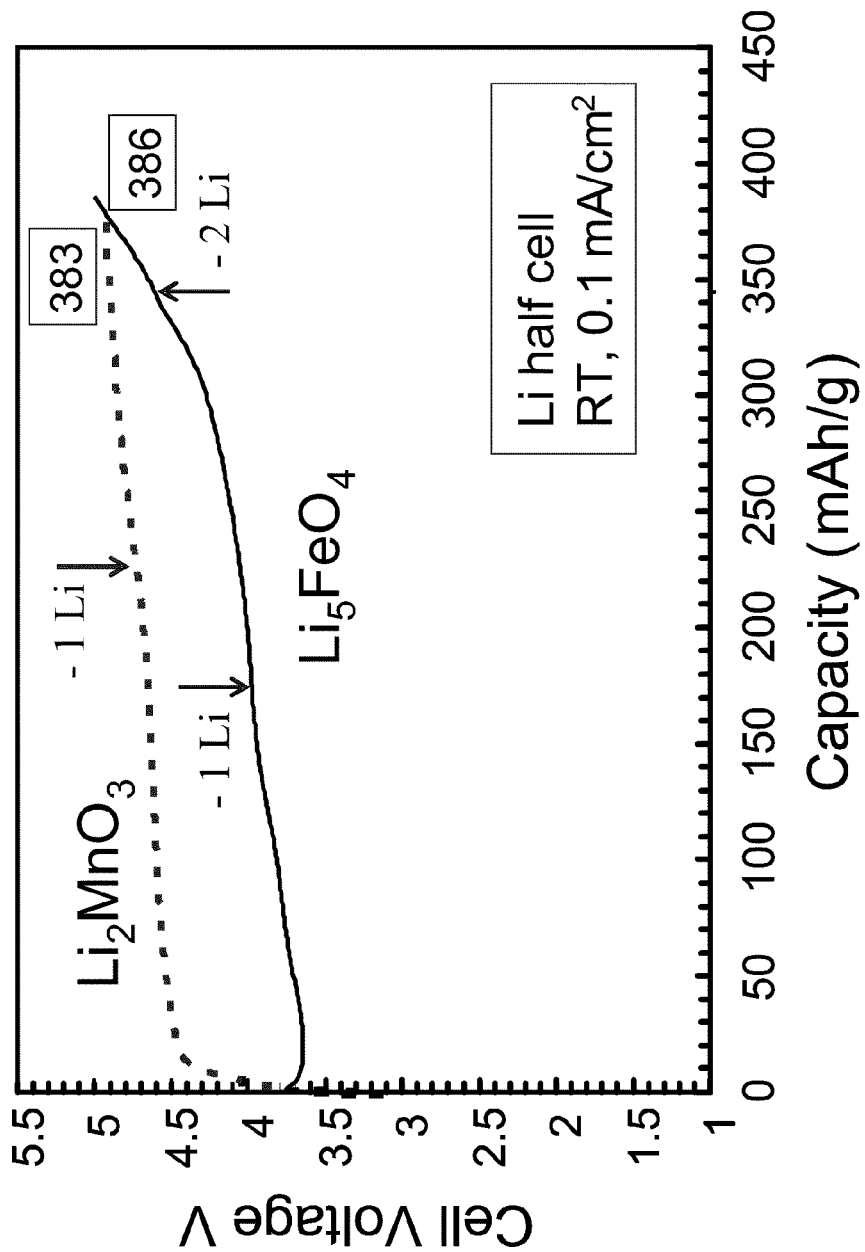
FIG. 3 is an illustration of the voltage profiles for the activation of $Li_2MnO_3(Li_2O.MnO_2)$ and $Li_5FeO_4$ ($5Li_2O.Fe_2O_3$) electrode precursors when charged to 5 V vs. a graphitic carbon anode.

Electrochemical Activation of $Li_2MnO_3$ and $Li_5FeO_4$ Precursor Electrodes in $Li/Li_2MnO_3$ and $Li/Li_5FeO_4$ Cells The voltage profiles of lithium cells with $Li_2MnO_3$ and $Li_5FeO_4$ precursor cathodes for the initial charge to 5 V, during which the electrodes are activated, are demonstrated in FIG. 3. Ignoring electrolyte-induced side reactions, the data indicate that approximately 83% of the lithium, corresponding to 1.67 $Li^+$ ions per $Li_2MnO_3$ unit or 383 mAh/g, can be removed from $Li_2MnO_3$ when charged to 5 V, and that approximately 45% of the lithium, corresponding to 2.23 $Li^+$ ions per $Li_5FeO_4$ unit, or 386 mAh/g, can be removed from $Li_5FeO_4$. X-ray Absorption Near Edge Spectroscopy (XANES) data, obtained at Argonne National Laboratory, have indicated that during the electrochemical extraction from $Li_2MnO_3$, there appears to be no detectable or significant change to the oxidation state of the manganese, thereby providing strong evidence that the removal of $Li_2O$ accounts predominantly to the capacity withdrawn from the electrodes. Although electrochemical extraction of lithium from $Li_5FeO_4$ has been reported previously by Imanishi et al. in the Journal of Power Sources, Volume 146, page 21(2005) to occur with some oxidation of the iron ions, XANES data of chemically-delithiated samples using $NO_2BF_4$ in acetonitrile as an oxidizing agent, as reported by Johnson et al. in Chemistry of Materials, Volume 22, page 1263(2010), have demonstrated that negligible oxidation of the ferric ions occurs, suggesting that lithium is removed simultaneously with oxygen as $Li_2O$. The data show that lithium extraction and oxygen removal occurs far more readily, i.e., at lower potentials, from the $Li_5FeO_4$ precursor electrode than it does from $Li_2MnO_3$. In particular, the charging potential of the $Li_5FeO_4$ electrode, 3.6 to 4.5 V, for the extraction of two lithium ions is particularly attractive because it falls largely within the electrolyte stability window of organic electrolyte solvents.

Example 2

Electrochemical Capacity of $Li_2MnO_3$ and $Li_5FeO_4$ Precursor Electrodes

Both $Li_2MnO_3$ and $Li_5FeO_4$ and substituted materials have been investigated and reported previously as cathode materials for lithium-ion batteries. For example, $Li_2MnO_3$ was reported by Kalyani et al., in the Journal of Power Sources, Volume 80, page 103(1999) and acid-treated samples by Johnson et al. in The Journal of Power Sources, Volume 81-82, page 491(1999); $Li_5FeO_4$ was reported by Imanishi et al., in the Journal of Power Sources, Volume 146, page 21(2005). Although these cathode materials can provide capacities in excess of 200 mAh/g on the initial discharge cycle, they suffer from a very large irreversible capacity loss on the initial cycle and are limited by poor cycling efficiency, particularly on long-term cycling and relatively low operating potentials; these limitations and inferior electrochemical properties of these cathodes compared to state-of-the-art materials, such as $LiCoO_2$, $LiNi_{0.8}Co_{0.15}Al_{0.05}O_2$, $LiNi_{0.33}Mn_{0.33}Co_{0.33}O_2$, spinel $LiMn_2O_4$ and olivine $LiFePO_4$ and/or compositional modifications thereof, preclude their use in commercial lithium cells and batteries.

Despite the above-mentioned limitations, the applicants have discovered that $Li_2O$-containing precursor materials and acid-treated precursor materials can operate more effectively when used in lithium-air cells, in which the $Li_2O$-containing materials can act as a support for the air electrode, while at the same time contributing at least partially to the capacity of the electrode. $Li_2O$-containing precursor materials with a defect antifluorite structure are particularly attractive candidates for such use because they have a structure closely related to $Li_2O$ itself which is the product of a completely discharged $Li/O_2$ (air) cell.

Figure 5:
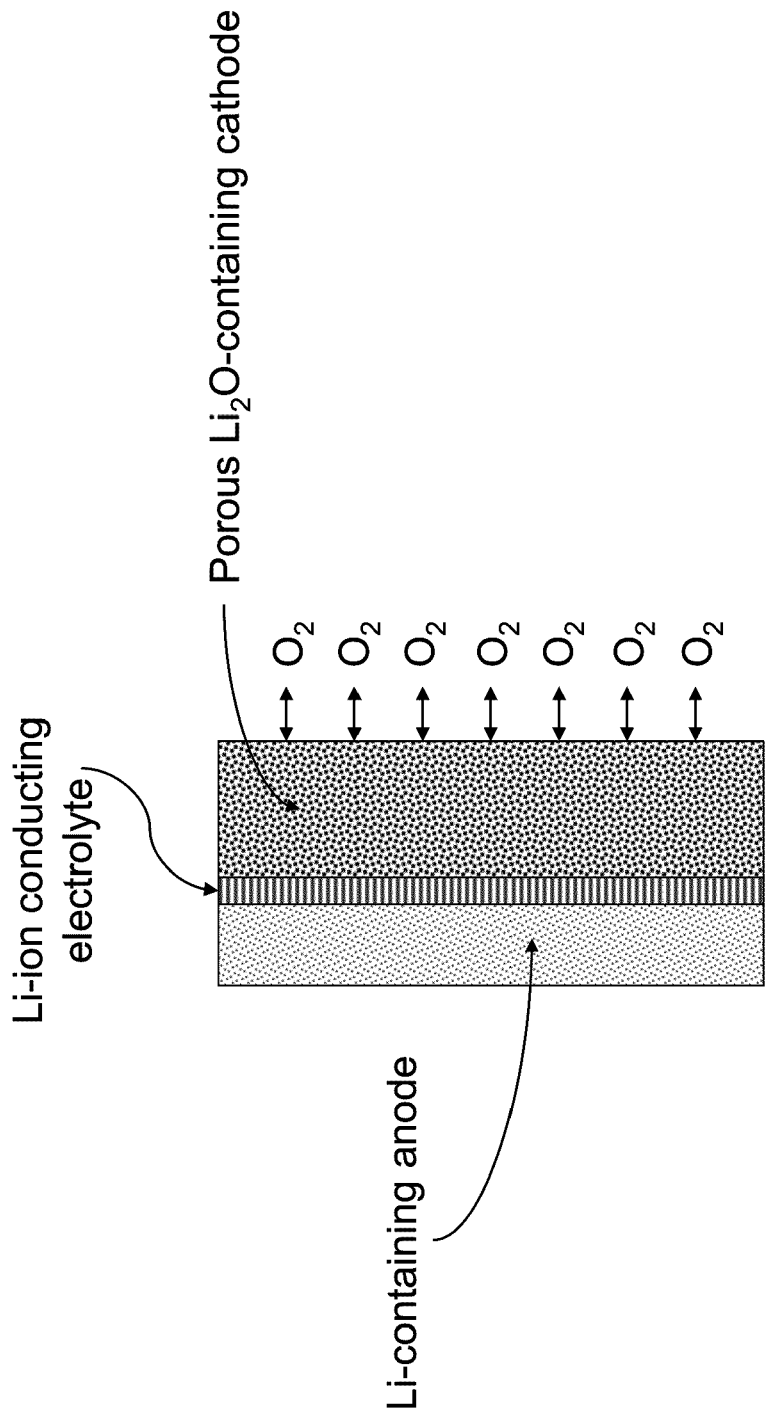
FIG. 5 is a schematic representation of an electrochemical lithium-oxygen cell.

Lithium-oxygen (air) cells have already been constructed and demonstrated to work in practice, for example, those containing a lithium metal foil anode, a solid electrolyte separator and an air cathode that contains a carbon substrate and a $MnO_2$ catalyst to aid the discharge/charge reactions. A typical design of a lithium-oxygen (air) cell is presented schematically in FIG. 5. In this example, the anode is comprised of a lithium-containing anode, separated from the air electrode compartment by a lithium-ion conducting solid electrolyte, such as a lithium-phosphorus-oxynitride (LI-PON) glass electrolyte, which is known in the art. In a particular embodiment of this invention, the cathode compartment consists of a porous substrate comprised of one or more $Li_2O$-containing precursor materials together with current collecting- and/or electrocatalytic materials that are required to ensure good electrical contact between the particles and to ensure high charge and discharge current rates.

Figure 4:
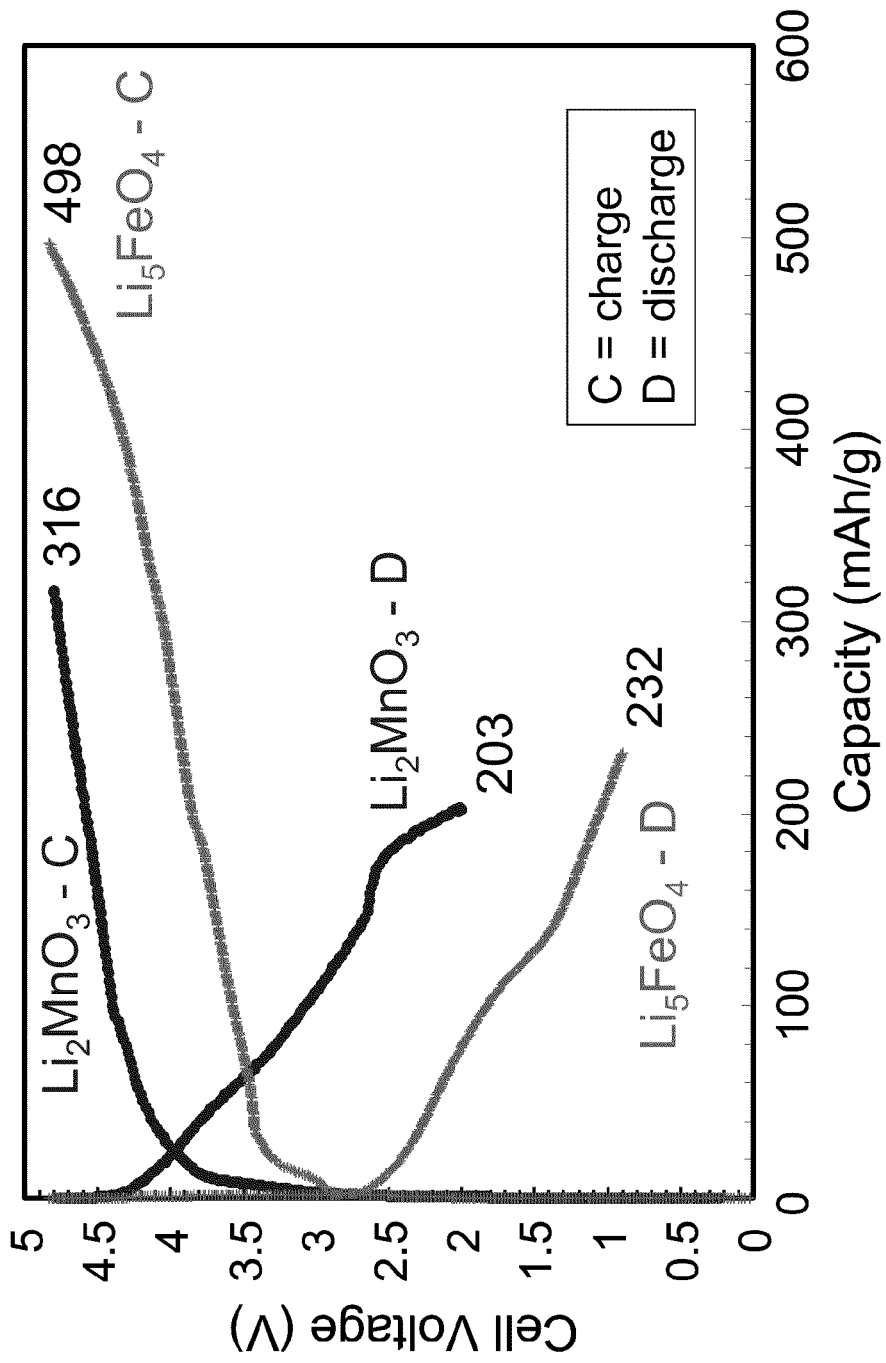
FIG. 4 is an illustration of the initial charge and discharge of lithium cells with $Li_2MnO_3(Li_2O.MnO_2)$ and $Li_5FeO_4$ ($5Li_2O.Fe_2O_3$) cathode precursors when charged to 4.8 V and discharged to 2.0 and 0.8 V, respectively, vs. a metallic lithium anode.

Taking $Li_5FeO_4$ as an example, together with the data in FIGS. 3 and 4 that demonstrate that at least one $Li_2O$ unit can be extracted from the $Li_5FeO_4$ structure below about 4.5 V, the following performance characteristics can be determined. The extraction of 2 lithium ions per $Li_5FeO_4$ unit of the precursor electrode with the concomitant removal of oxygen (i.e., a net loss of $Li_2O$) yields a capacity of 340 mAh/g. In principle, this capacity is recovered during the reverse reaction between lithium, delivered by the anode, and oxygen supplied to the cathode to regenerate a '$Li_5FeO_4$' composition during discharge; in addition, because $Li_5FeO_4$ can, in principle, accommodate an additional lithium ion within its structure, with the concomitant reduction of ferric to ferrous ions to yield $Li_6FeO_4$, the total discharge capacity of the electrode translates to 510 mAh/g. An average discharge voltage of 2.6 V would yield a cell energy of 1326 mWh/g (1326 Wh/kg) based on the active electrode materials alone, which is significantly higher than that delivered by state-of-the-art lithium-ion batteries. For example, the cell energies delivered by commercially available lithium battery cathode materials, taking into the mass of the active materials only and average cell voltage for $LiCoO_2$(about 140 mAh/g, 3.6 V), $LiNi_{0.8}Co_{0.15}Al_{0.05}O_2$(about 170 mAh/g, 3.6 V), $LiNi_{0.33}Mn_{0.33}Co_{0.33}O_2$(about 170 mAh/g, 3.6 V), spinel $LiMn_2O_4$ (about 120 mAh/g, 3.9 V) olivine $LiFePO_4$(about 160 mAh/g, 3.4 V) are 504, 612, 612, 468, and 544 Wh/kg, respectively. Furthermore, the lower operating cell voltage of the lithium-oxygen (air) electrodes of this invention is expected to provide inherently safer battery systems than those based on lithium-ion chemistries with the higher potential cathodes described above.

Figure 6:
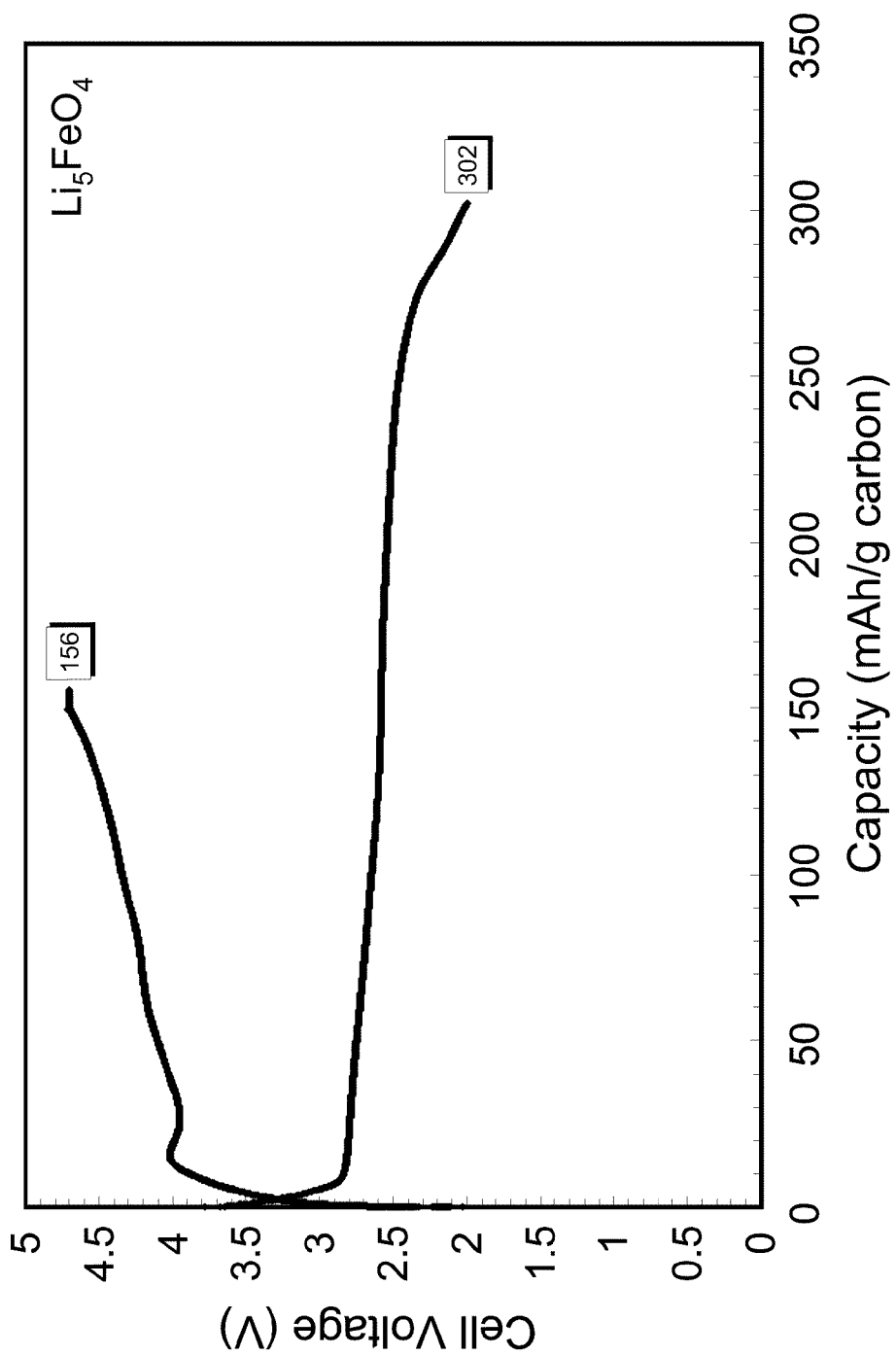
FIG. 6 provides a plot of cell voltage versus capacity for the initial charge and discharge of a lithium-oxygen electrochemical cell comprising a $Li_5FeO_4$ ($5Li_2O.Fe_2O_3$) electrode precursor of the present invention.

The principles of this invention were first demonstrated in the following practical example. Precursor cathodes, with the composition of about 70% carbon black (Vulcan XC 72R, Cabot), about 23% $Li_5FeO_4$, and about 7% PVDF binder (Kynar) were prepared from a slurry of the cathode components using a N-methyl-pyrollidinone solvent (NMP, Aldrich, 99%), and applied as a paste onto a carbon cloth. The cathode was dried first at about 70° C. for about 1-2 hours in air, then vacuum-dried for 2 hours at about 60-70° C. For the electrochemical evaluation, the air cathode was placed in an oxygen pressurized cell (40 psi) comprising a lithium foil anode, an ethylmethyl carbonate (EMC)/ethylene carbonate (EC) electrolyte (EMC:EC=7:3 by volume) and a microporous polypropylene separator (Celgard). The electrodes were pressed together under a light load, and discharged and charged at a 0.0125 mA/cm$^2$ rate (current density 3 mA/g) between 4.7 and 2.0 V vs. Li/Li$^+$. The initial charge discharge profile of the cell is shown in FIG. 6. These initial data, while demonstrating the principles of the invention, were not optimized. Improvements in the performance of these Li-air cells are to be expected, as is typically the case, as advances in electrode composition, electrolyte formulations, cell design and so forth are made.

For example, we have demonstrated that by changing the cell design, the capacity of lithium-metal-oxide electrocatalyst materials, such as $Li_5FeO_4(5Li_2O.Fe_2O_3)$ and a combination of $LiFeO_2(Li_2O.Fe_2O_3)$ and $Li_2MnO_3(Li_2O.MnO_2)$, and acid-treated derivatives thereof, can be significantly improved. For these experiments, the following synthesis-, cell construction-, and electrochemical evaluation procedures were followed:

Synthesis $Li_2MnO_3$ and $LiFeO_2$ electrocatalysts were synthesized, either singly or in combination, using a sol-gel technique. First, a 2.58 M glycolic acid solution was heated to approximately 70° C. on a hot plate while stirring. Ammonium hydroxide was added dropwise to the glycolic acid solution until the pH of the solution reached 8-9. Acetate salts of lithium, manganese, and iron (when included) were dissolved into 100 mL of water and then slowly added, dropwise, to the solution. During this process, the pH was maintained between 8-9 using ammonium hydroxide, while the temperature was maintained between 70-80° C. On stirring for 1-3 hours, the sol-gel slowly thickened. After cooling to room temperature, the gel was transferred to a porcelain vessel and heated in air in a furnace using a 2-stage program, first at 400° C., and thereafter at 750° C.

An acid-treated electrocatalyst comprised of the combined $LiFeO_2$ and $Li_2MnO_3$ sol-gel product was synthesized by reacting approximately 0.5 grams of the parent material with 2.5 M sulfuric acid (approximately 60 ml) for 24 hours. Thereafter, the resulting powder was vacuum-filtered, rinsed with water, and dried in air at 75° C. overnight.

Electrode Fabrication and Cell Construction:

Electrodes containing the electrocatalyst materials of this invention were fabricated as laminates as follows. The relative amounts of electrocatalyst ($Li_5FeO_4$ or a combination of $LiFeO_2$ and $Li_2MnO_3$), Super P Li carbon (Timcal), Kynar binder, grade 2801(Elf Atochem), and propylene carbonate used for making the slurries are summarized in Table 2 that includes two acid-treated $LiFeO_2$ and $Li_2MnO_3$ samples, labeled (1) and (2). Sample (2) contained a significantly higher proportion of electrocatalyst than sample (1), relative to the masses of the other electrode components. Acetone was used to ensure that the slurry had a workable consistency. The slurry mixtures were stirred for 3-4 hours and sonicated for about a minute, two or three times during mixing. The slurry was then cast onto a glass plate and spread with a doctor blade set to 350 micrometers. Thereafter, the film was lifted from the glass substrate and stored a dessicator overnight. Half-inch diameter discs were punched from the laminates and weighed prior to cell assembly in an argon-filled glovebox.

TABLE 2

Relative amounts (in grams) of the components used for various oxygen electrodes

| Component | Mass of the components used in various oxygen electrodes (g) | | | |
|---|---|---|---|---|
| | $Li_5FeO_4$ | $LiFeO_2$ + $Li_2MnO_3$ | Acid-treated $LiFeO_2$ + $Li_2MnO_3$ (1) | Acid-treated $LiFeO_2$ + $Li_2MnO_3$ (2) |
| Electrocatalyst | 0.094 | 0.0955 | 0.0957 | 0.1051 |
| Carbon | 0.055 | 0.0557 | 0.0559 | 0.0199 |
| Binder | 0.077 | 0.0765 | 0.0756 | 0.0256 |
| Propylene Carbonate | 0.288 | 0.2884 | 0.2761 | 0.1594 |

The cell hardware consisted of a Swagelok tube with an anode plunger and cathode tube. A punched disc of lithium was placed on the anode plunger, on top of which two glass fiber separators were positioned. Ten drops of electrolyte, consisting of a 1 M solution of $LiPF_6$ in propylene carbonate (PC) were added to the separators. Thereafter, the electrocatalyst (oxygen-electrode) disc, 2 more drops of electrolyte, and a half-inch disc of Al mesh that served as the current collector for the oxygen electrode were added to the assembly. The cathode tube was then fitted onto the cell, to complete the cell construction. The cell was then wired and enclosed in a sealed glass chamber with two closed air valves while still inside the glove box.

Electrochemical Evaluation

After removing the constructed cell from the glovebox, the glass chamber was purged with pure oxygen gas for approximately 30 minutes, before sealing the cell under 1 atm of $O_2$, and connecting the cell to a MACCOR system for the electrochemical tests. The cell voltage was monitored on open circuit for one hour prior to the cell cycling tests, which were conducted at a slow rate, typically between 50-100 mA per gram of carbon in the oxygen electrode compartment.

Electrochemical Data:

Electrochemical data obtained for the four oxygen-electrode materials listed in Table 2 are provided in FIGS. 7 to 11.

Figure 7:
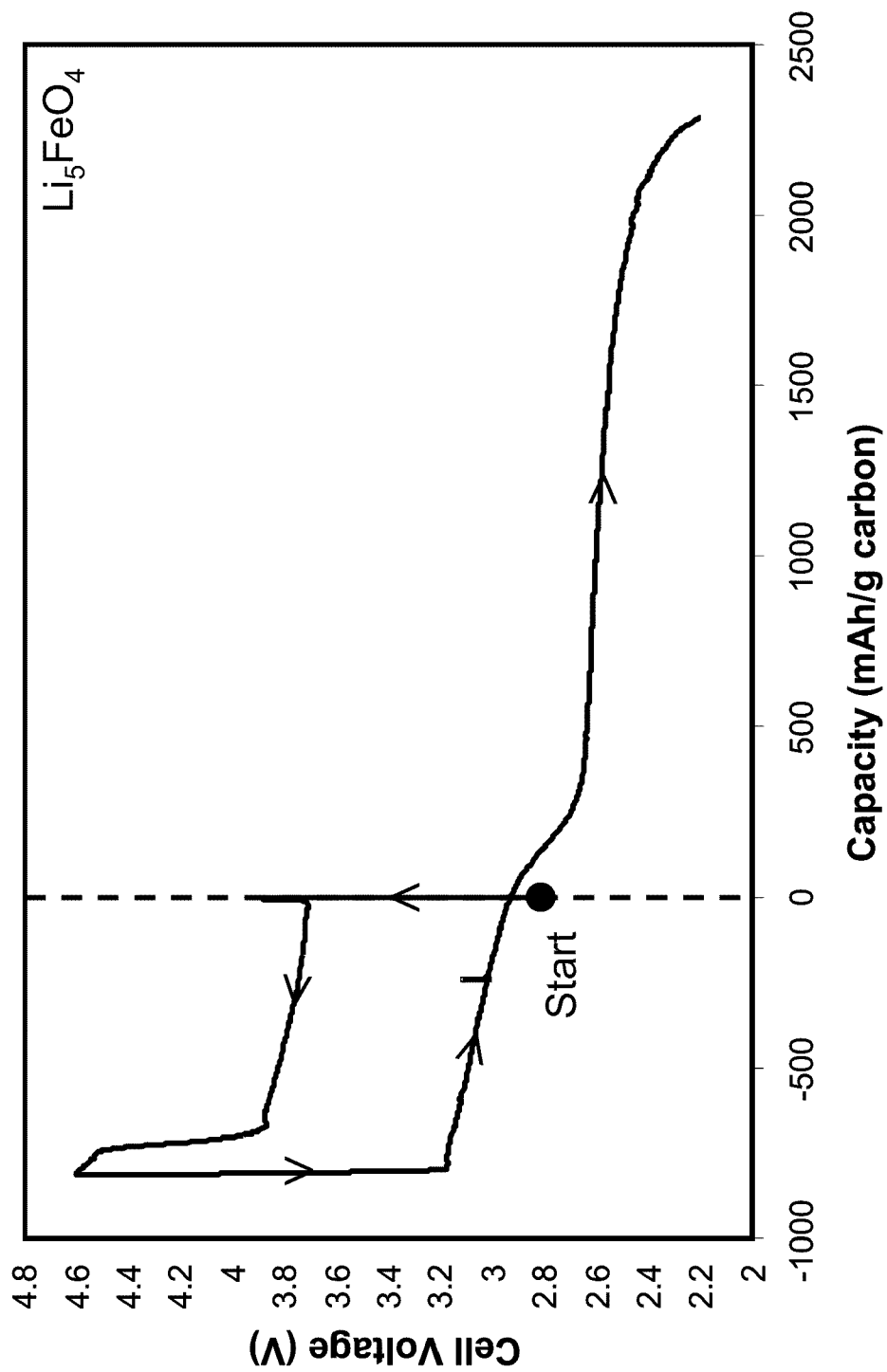
FIG. 7 provides a plot of cell voltage versus capacity for the initial charge and discharge of a second lithium-oxygen electrochemical cell comprising a $Li_5FeO_4$ ($5Li_2O.Fe_2O_3$) electrode precursor of the present invention.

FIG. 7 shows the voltage profiles of a $Li/Li_5FeO_4$—$O_2$ cell that was initially charged to 4.6 V, followed by a discharge to 2.2 V. In addition to the electrochemical formation of $Li_2O_2$ and $Li_2O$ that takes place in conventional $Li/O_2$ cells typically between 2.8 and 2.5 V, the $Li/Li_5FeO_4$—$O_2$ cell of the invention provided approximately 900 mAh/g (carbon) of capacity between 3.2 and 2.8 V, which was attributed, at least in part, to lithium insertion into the delithiated $Li_{5-x}FeO_{4-x/2}$ electrocatalyst and the concomitant reduction of ferric to ferrous ions. (Note that at full delithation (x=5), the delithiated electrocatalyst would have the composition $Fe_2O_3$.) The total capacity delivered by the cell during discharge was approximately 3100 mAh/g (carbon).

Figure 8:
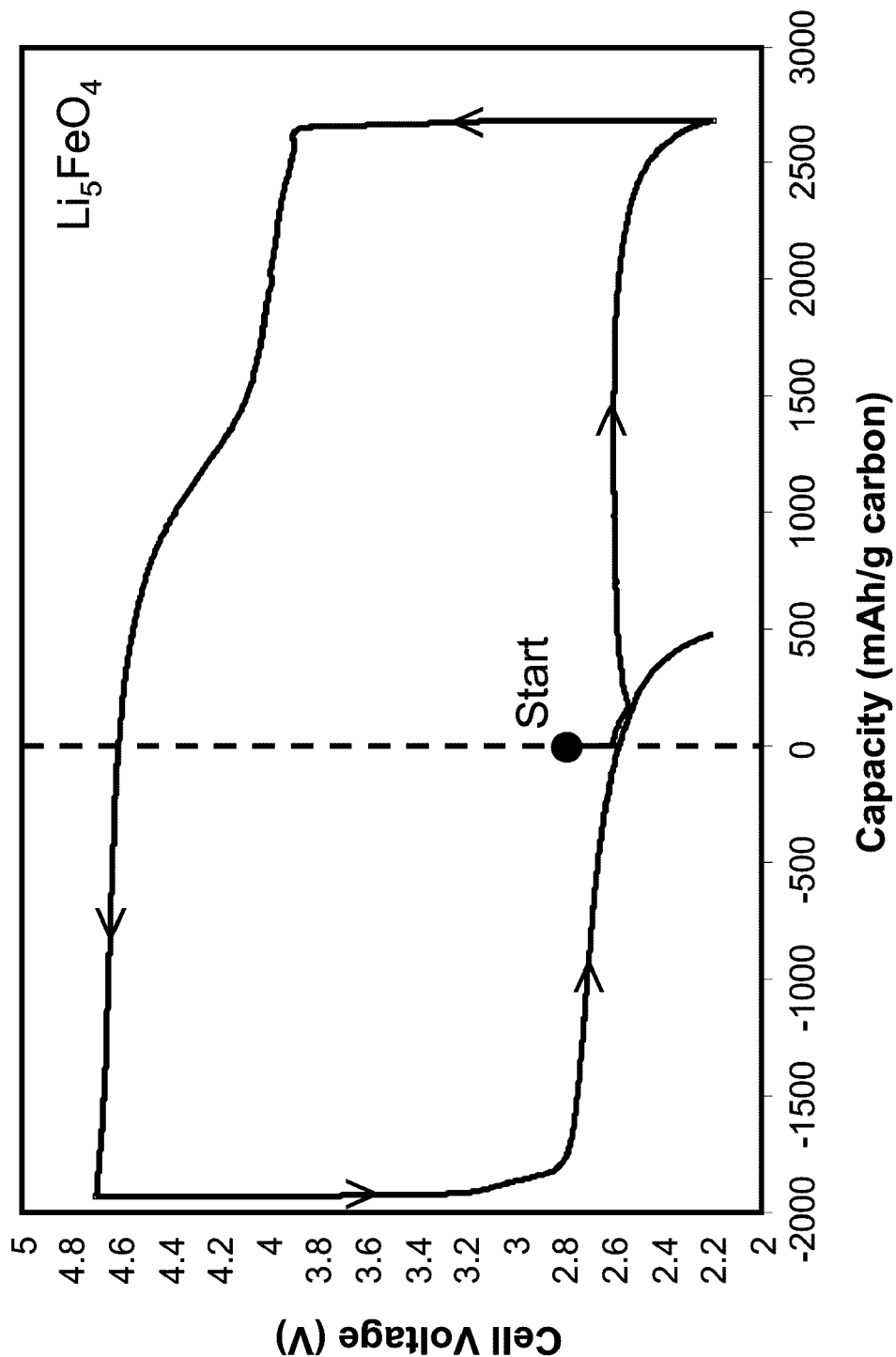
FIG. 8 provides a plot of cell voltage versus capacity for the initial discharge, the initial charge and subsequent discharge of an electrochemical lithium-oxygen cell comprising a $Li_5FeO_4(5Li_2O.Fe_2O_3)$ electrode precursor of the present invention.
Figure 9:
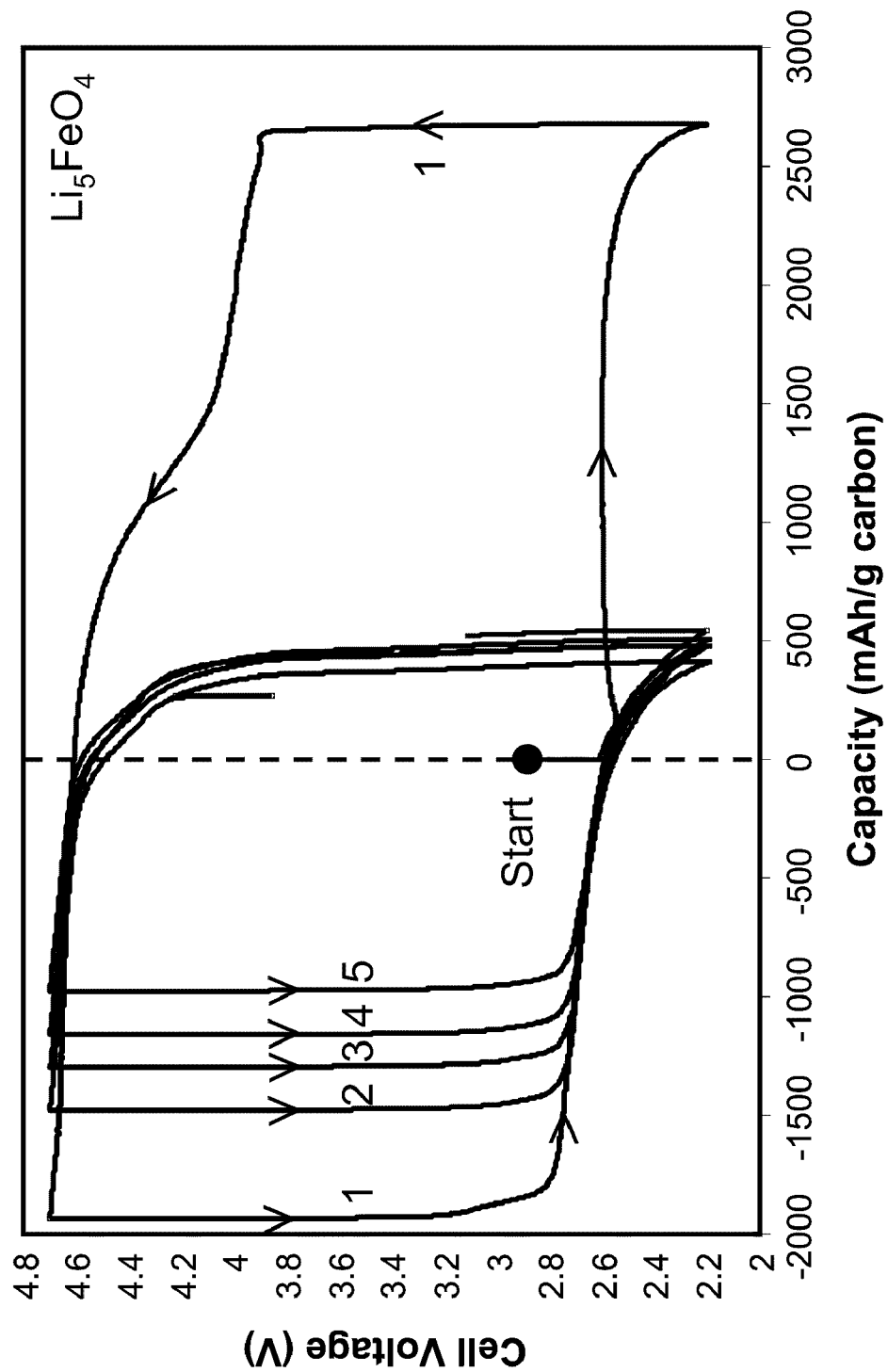
FIG. 9 provides a plot of cell voltage versus capacity for the initial five discharge/charge cycles of an electrochemical lithium-oxygen cell comprising a $Li_5FeO_4$ ($5Li_2O.Fe_2O_3$) electrode precursor of the present invention.

FIG. 8 shows the voltage profiles of a $Li/Li_5FeO_4$—$O_2$ cell that was initially discharged to 2.2 V, followed by a charge to 4.7 V, and a subsequent discharge back to 2.2 V. In this experiment, the cell provided a discharge capacity of approximately 2700 mAh/g (carbon) on the initial discharge, and a capacity of approximately 2400 mAh/g on the second cycle. The cycling behavior (non-optimized) of the $Li/Li_5FeO_4$—$O_2$ cell for the first five cycles is shown in FIG. 9.

Figure 10:
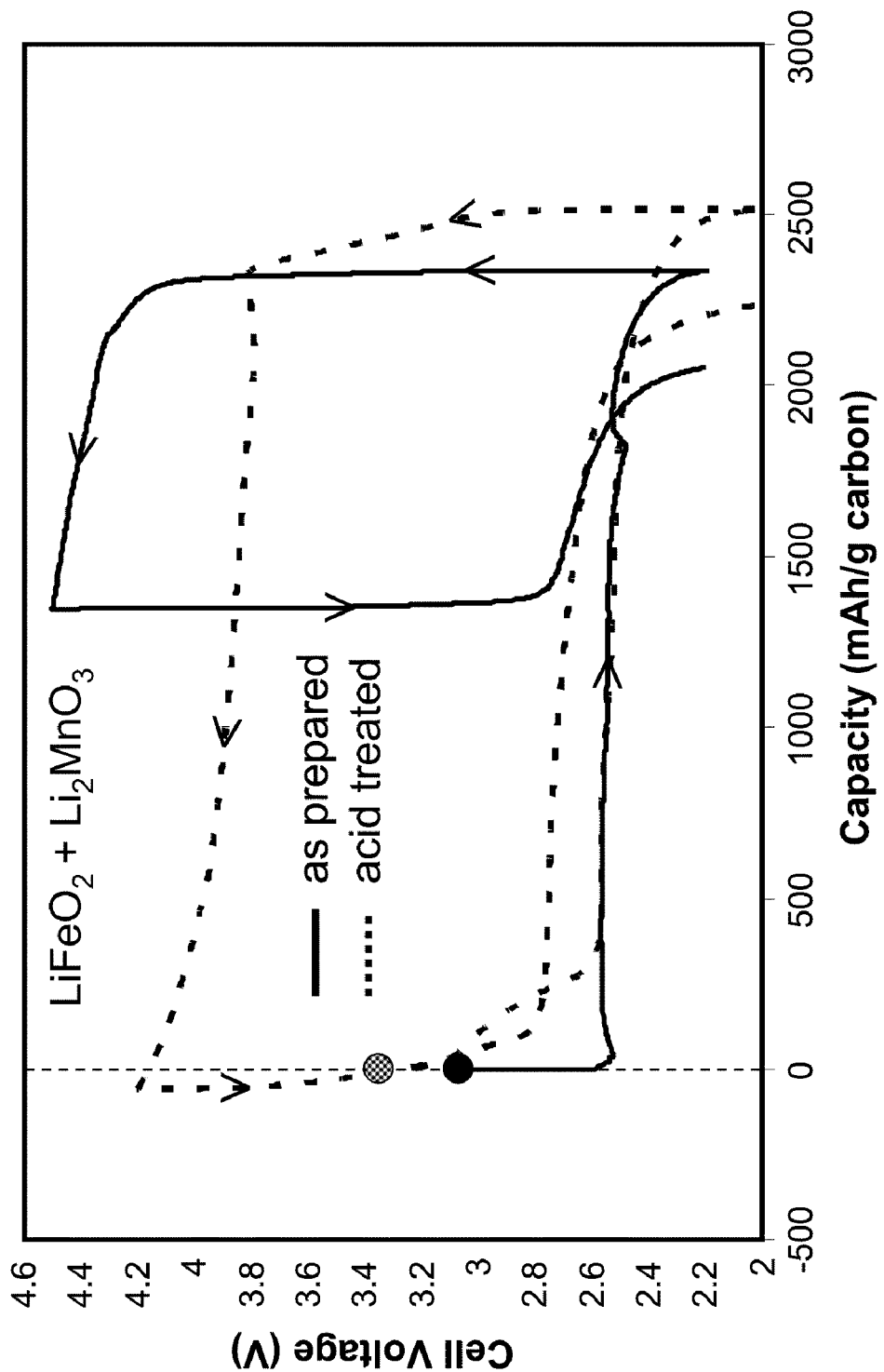
FIG. 10 provides a plot of cell voltage versus capacity for the initial discharge, the initial charge and subsequent discharge of two electrochemical lithium-oxygen cells one comprising a mixed $LiFeO_2(Li_2O.Fe_2O_3)$ and $Li_2MnO_3$ ($Li_2O.MnO_2$) electrode precursor (solid line) and the other a mixed, acid-treated $LiFeO_2(Li_2O.Fe_2O_3)$ and $Li_2MnO_3$ ($Li_2O.MnO_2$) electrode precursor (dashed line) of the present invention.
Figure 11:
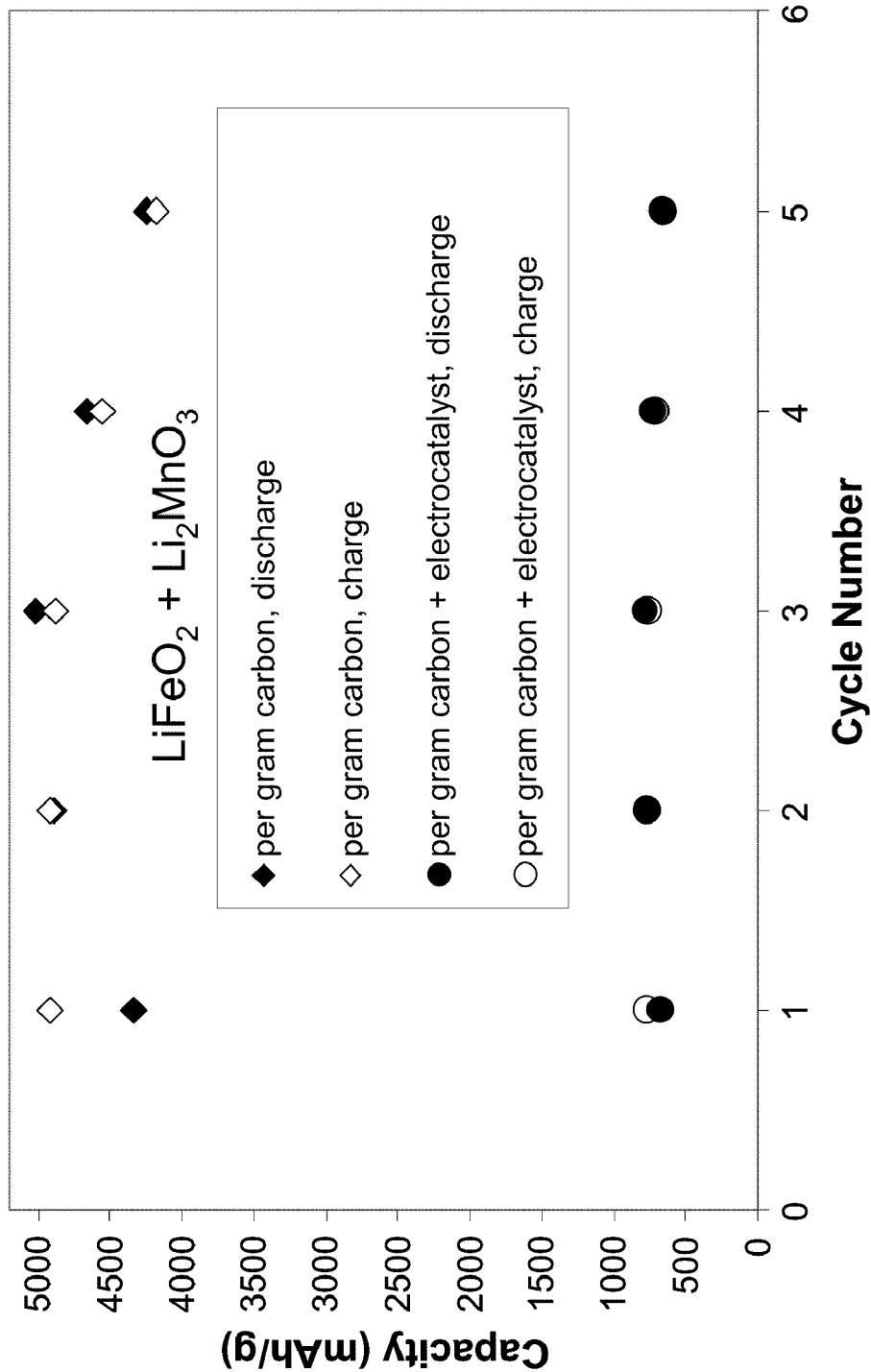
FIG. 11 provides a electrode capacity versus cycle number for the initial five cycles of an electrochemical lithium-oxygen cell comprising a mixed, acid-treated $Li_2MnO_3$ ($Li_2O.MnO_2$) and $LiFeO_2(Li_2O.Fe_2O_3)$ electrode precursor, in which the electrode capacity is calculated on (1) the mass of carbon only, and (2) the mass of both carbon and the electrode precursor.

FIG. 10 shows the voltage profiles of two separate $Li/LiFeO_2+Li_2MnO_3$—$O_2$ cells, one of which contained an as-prepared $LiFeO_2(Li_2O.Fe_2O_3)$ and $Li_2MnO_3$ ($Li_2O.MnO_2$) electrocatalyst, and the other an acid-treated $LiFeO_2(Li_2O.Fe_2O_3)$ and $Li_2MnO_3(Li_2O.MnO_2)$ electrocatalyst in which some of the $Li_2O$ content had been removed by the acid treatment process. The former cell was subjected to an initial discharge to 2.2 V, followed by a charge to 4.7 V and a subsequent discharge to 2.2 V; the latter cell was subjected to an initial discharge to 2.0 V, followed by a charge to 4.2 V and a subsequent discharge to 2.0 V. The data clearly highlight the superior electrochemical cycling behavior of the acid-treated electrocatalyst. The cycling data, shown in FIG. 11, indicated that the acid-treated electrodes could deliver between 4000 and 5000 mAh/g (carbon), which translates to approximately 600-700 mAh/g of the $LiFeO_2+Li_2MnO_3$ electrocatalyst alone, which is significantly higher than the capacity delivered by lithium metal oxide electrodes, typically 100-200 mAh/g, in conventional lithium-ion cells.

Figure 13:
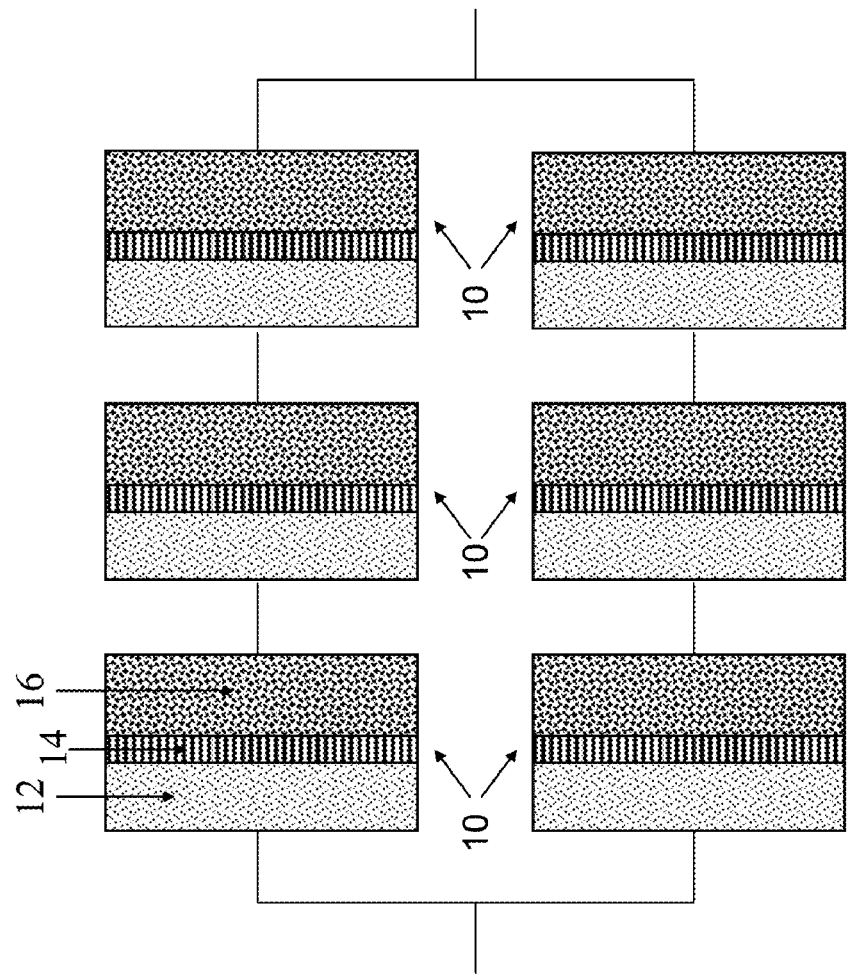
FIG. 13 is a schematic representation of a battery consisting of a plurality of cells connected electrically in series and in parallel.
Figure 12:
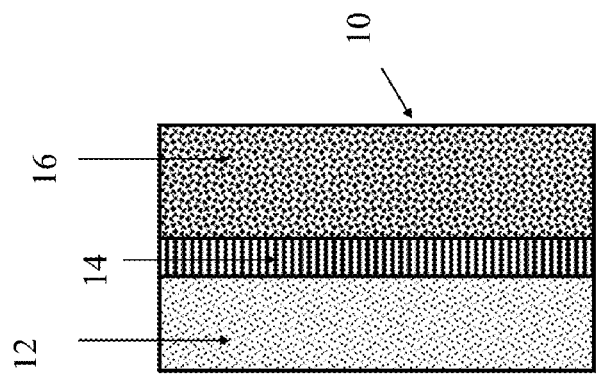
FIG. 12 is a schematic representation of an electrochemical cell of the invention.

This invention therefore relates to $Li_2O$-containing compounds that can be used as electrocatalytic precursor materials for positive electrodes in both primary and secondary (rechargeable) lithium-oxygen (air) cells and batteries, a typical cell being shown schematically in FIG. 12, represented by the numeral 10 having a negative electrode 12 separated from a cathode compartment containing oxygen and positive electrode 16 by an electrolyte 14, all components within a suitable housing with terminals (not shown) being provided in electronic contact with the negative electrode 12 and the positive electrode 16. Binders, current collectors and other materials normally associated with both the electrolyte and the negative and positive electrodes are well known in the art and are not fully described herein, but are included as is understood by those of ordinary skill in this art. FIG. 13 shows a schematic illustration of one example of a battery in which two strings of electrochemical lithium cells, described above, are arranged in parallel, each string comprising three cells arranged in series. The invention also includes methods for making the $Li_2O$-containing precursor electrode compounds and methods for activating the precursor electrodes in lithium cells and batteries including the same.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. It is also understood that additional improvements in the composition, capacity and stability of the electrodes and to the overall cell design can be expected to be made in the future, for example, by improving and optimizing the processing techniques whereby $Li_2O$-containing compounds can be fabricated and incorporated as precursor electrodes in electrochemical lithium-oxygen (air) cells.

The embodiments of the invention in which an exclusive property or privilege is claimed are defined as follows:

1. A lithium-oxygen or lithium-air electrochemical cell comprising a negative electrode, an electrolyte, and a porous activated positive electrode produced by activating a precursor positive electrode formed from a material comprising one or more metal oxide compounds having the general formula $xLi_2O.yMO_z$, in which $0 \leq x \leq 4$, $0 \leq y \leq 1$, and $0 < z \leq 3$, in which M is a metal ion, excluding $Li_2MnO_3$ as a sole metal oxide compound in the precursor electrode, wherein the electrode is activated by removing $Li_2O$ from at least one metal oxide compound of the precursor electrode, wherein the positive electrode is supplied with oxygen during discharge of the cell.

2. The electrochemical cell of claim 1, wherein the precursor electrode material is crystalline, partially crystalline, or amorphous.

3. The electrochemical cell of claim 1, wherein the precursor electrode material has a cation-deficient or anion-deficient structure.

4. The electrochemical cell of claim 1, wherein the precursor electrode material comprises anion- or cation-substituted compositions and structures.

5. The electrochemical cell of claim 1, wherein M comprises one or more metals selected from the group consisting of 1st, 2nd and 3rd row transition metals.

6. The electrochemical cell of claim 5, wherein M comprises a metal selected from the group consisting of V, Mn, Fe, Ni, Co, Mo, Ru, Pt and Ir.

7. The electrochemical cell of claim 5, wherein M is partially substituted by Li.

8. The electrochemical cell of claim 5, wherein oxygen ions of the compound of general formula $xLi_2O.yMO_z$ are partially substituted by fluorine ions.

9. The electrochemical cell of claim 5, wherein M is partially substituted by one or more non-transition metal ions.

10. The electrochemical cell of claim 9, wherein the non-transition metal ions are selected from the group consisting of $Mg^{2+}$, $Al^{3+}$ and $Si^+$ and $P^{5+}$ ions.

11. The electrochemical cell of claim 1, wherein precursor electrode comprises one or more of $LiV_3O_8(Li_2O.3V_2O_5)$, $Li_3VO_4(3Li_2O.V_2O_5)$, $Li_4Mn_5O_{12}(2Li_2O.5MnO_2)$, $Li_{0.3}MnO_{2.15}(0.15Li_2O.MnO_2)$, $LiFeO_2(Li_2O.Fe_2O_3)$, $Li_2MoO_4(4Li_2O.MoO_3)$ $Li_2RuO_3(Li_2O.RuO_2)$, $Li_8PtO_6$ $(4Li_2O.PtO_2)$ and $Li_8IrO_6(4Li_2O.IrO_2)$, or $Li_2MnO_3$ in combination with one or more of the foregoing compounds.

12. The electrochemical cell of claim 1, wherein the precursor electrode material has an antifluorite-type structure or a defect antifluorite-type structure.

13. The electrochemical cell of claim 12, wherein the precursor electrode comprises one or more materials selected from the group consisting of $Li_5FeO_4(5Li_2O.Fe_2O_3)$, $Li_6CoO_4(3Li_2O.CoO)$, $Li_6NiO_4(3Li_2O.NiO)$, and $Li_6MnO_4$ $(3Li_2O.MnO)$, or $Li_2MnO_3$ in combination with one or more of the foregoing compounds.

14. The electrochemical cell of claim 1, wherein the precursor electrode further comprises one or more of a metal catalyst, a catalytic compound, or a combination thereof.

15. The electrochemical cell of claim 14, wherein the metal catalyst comprises one or more transition-metal or precious-metal elements.

16. The electrochemical cell of claim 14, wherein the metal catalyst comprises one or more of Fe, Mn, Co, Ni, Ru, Pt, and Ir.

17. The electrochemical cell of claim 14, wherein the catalytic compound comprises a metal oxide.

18. The electrochemical cell of claim 17, wherein the metal oxide is $MnO_2$ or $V_2O_5$.

19. The electrochemical cell of claim 1, wherein the precursor electrode comprises primary and secondary particles with an average primary particle less than 1 micron and an average secondary particle less than 50 microns.

20. The electrochemical cell of claim 19, wherein the primary particles have an average size of 500 nm or less.

21. The electrochemical cell of claim 19, wherein the primary particles have an average size of 200 nm or less.

22. The electrochemical cell of claim 19, wherein the primary particles have an average size of 100 nm or less.

23. The electrochemical cell of claim 1, wherein the electrode is activated by applying a sufficiently high potential to the precursor electrode to remove $Li_2O$ from the positive electrode.

24. The electrochemical cell of claim 23, wherein the lithium from the $Li_2O$ removed from the positive electrode is loaded into the negative electrode of the cell.

25. The electrochemical cell of claim 1, wherein the positive electrode is activated by acid treatment to remove $Li_2O$ from the precursor electrode material or to effect $H^+$ ion exchange for the lithium ions, or both.

26. The electrochemical cell of claim 1, wherein the positive electrode is activated by removing $Li_2O$ from the positive electrode during a charging process.

27. The electrochemical cell of claim 1, wherein the oxygen supplied to the positive electrode comprises pure oxygen, air, or oxygen diluted with an electrochemically inert gas.

28. The electrochemical cell of claim 1, wherein the negative electrode of the electrochemical cell comprises one or more of a carbon material, a metal material, a semi-metal material, an intermetallic material, and a metal oxide material.

29. The electrochemical cell of claim 1, wherein the negative electrode of the electrochemical cell comprises one or more of amorphous carbon, graphite, Li, Sn, Si, $Cu_6Sn_5$, and $Li_4Ti_5O_{12}$.

30. The electrochemical cell of claim 1, wherein the electrolyte of the electrochemical cell comprises one or more of a solid electrolyte and a liquid electrolyte.

31. The electrochemical cell of claim 1, wherein the electrolyte of the electrochemical cell comprises one or more of a solid electrolyte and a non-aqueous liquid electrolyte.

32. A lithium battery comprising a plurality of electrically connected electrochemical lithium-oxygen or lithium-air cells of claim 1.

* * * * *